United States Patent
Smeeton et al.

(10) Patent No.: US 12,072,671 B2
(45) Date of Patent: Aug. 27, 2024

(54) HOLOGRAPHIC PROJECTOR HAVING A FAULT DETECTION CIRCUIT AND METHOD OF USING SAME

(71) Applicant: Envisics Ltd, Milton Keynes (GB)

(72) Inventors: Timothy Smeeton, Milton Keynes (GB); Alexander Cole, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 569 days.

(21) Appl. No.: 17/364,265

(22) Filed: Jun. 30, 2021

(65) Prior Publication Data

US 2022/0043394 A1 Feb. 10, 2022

(30) Foreign Application Priority Data

Aug. 5, 2020 (GB) .................................... 2012165

(51) Int. Cl.
*G03H 1/22* (2006.01)
*G01S 17/89* (2020.01)
*G03H 1/08* (2006.01)

(52) U.S. Cl.
CPC .......... *G03H 1/2294* (2013.01); *G01S 17/89* (2013.01); *G03H 1/0808* (2013.01); *G03H 1/2205* (2013.01); *G03H 1/2249* (2013.01); *G03H 2001/221* (2013.01); *G03H 2001/2244* (2013.01)

(58) Field of Classification Search
CPC ... G03H 1/2294; G03H 2001/22; G01S 17/89
See application file for complete search history.

(56) References Cited

U.S. PATENT DOCUMENTS

| 2009/0273662 A1 | 11/2009 | Lucente |
| 2015/0053848 A1 | 2/2015 | Gardner |
| 2020/0150589 A1* | 5/2020 | Wengierow .............. G03H 1/32 |

(Continued)

FOREIGN PATENT DOCUMENTS

| EP | 0 840 159 A2 | 5/1998 |
| EP | 1 752 838 A1 | 2/2007 |

(Continued)

*Primary Examiner* — Mohamed A. Wasel
(74) *Attorney, Agent, or Firm* — McDonnell Boehnen Hulbert & Berghoff LLP

(57) ABSTRACT

A holographic projector comprising a spatial light modulator arranged to display a hologram of a light pattern for projection and to spatially-modulate light, in accordance with display, to form a holographic reconstruction, wherein the holographic reconstruction is spatially-separated from the spatial light modulator. If the holographic projection is operating properly, the formed holographic reconstruction should correspond to the light pattern. The holographic projector also comprises a detector array comprising a plurality of light detection elements arranged to detect light corresponding to a respective plurality of positions of the holographic reconstruction and to provide a respective plurality of output signals related to light detection, and a fault detection circuit arranged to compare one or more of the plurality of output signals from the respective plurality of light detection elements with one or more of a plurality of expected signals based on the light distribution of the light pattern.

19 Claims, 23 Drawing Sheets

(56) References Cited

U.S. PATENT DOCUMENTS

| | | | | |
|---|---|---|---|---|
| 2020/0301143 A1* | 9/2020 | Christmas | ............... | G03H 1/16 |
| 2021/0041834 A1* | 2/2021 | Christmas | ............ | G03H 1/0408 |
| 2022/0026850 A1* | 1/2022 | Giehl | ..................... | F21S 41/16 |

FOREIGN PATENT DOCUMENTS

| JP | 2006-301020 A | 11/2006 |
|---|---|---|
| NO | 2018100394 A1 | 6/2018 |
| WO | 2019224052 A1 | 11/2019 |

* cited by examiner

HOLOGRAPHIC PROJECTOR HAVING A FAULT DETECTION CIRCUIT AND METHOD OF USING SAME

CROSS-REFERENCE TO RELATED APPLICATIONS

The present application is a non-provisional patent application claiming priority to United Kingdom Patent Application No. GB 2012165.3, filed Aug. 5, 2020, the contents of which are hereby incorporated by reference in their entirety.

FIELD OF THE DISCLOSURE

The present disclosure relates to a projector. More specifically, the present disclosure relates to a holographic projector, a method of holographic projection and holographic projection system. Embodiments of the present disclosure relates to a light detection and ranging, "LIDAR", system arranged to make time of flight measurements of a scene and to a method of monitoring operation of a LIDAR system, for example for safety monitoring. Some embodiments relate to an automotive LIDAR system or to a LIDAR system comprised within a portable device. Other embodiments relate to a head-up display having improved safety.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example. The holographic projector may be used for light detection and ranging (LIDAR). Light detection and ranging (LIDAR) systems may be used in a variety of applications including portable devices and vehicles.

A moving diffuser may be used to improve image quality in devices which use coherent light such as holographic projectors.

The present disclosure is concerned with improvements in monitoring operation of holographic projectors, for example within light detection and ranging (LIDAR) systems. In particular, such improvements may include more reliable and/or more accurate techniques for monitoring safe operation of a hologram display device, within a LIDAR system.

SUMMARY

Aspects of the present disclosure are defined in the appended independent claims.

In general terms; a method, system and apparatus are provided, which enable accurate and efficient monitoring and control of the operation of a holographic projector, for example a holographic projector comprised within a light detection and ranging, "LIDAR", system arranged to make time of flight measurements of a scene. The monitoring and control can ensure safe operation of the holographic projector and of a light source arranged to illuminate the holographic projector. One or more light detectors are provided to monitor light signals. The monitored light signals may be from a holographic reconstruction, formed when a display device such as a spatial light modulator (SLM), displaying a hologram of a light pattern, is irradiated by suitable light, such as laser light. In another example, the monitored light signals may be from light that is travelling from an irradiated SLM, towards a holographic replay plane, and thus has not yet fully formed a holographic reconstruction. The monitored light in such an example may be referred to as being, or as being comprised within, a 'partial' holographic reconstruction. In another example, the monitored light signals may be from light that has formed a holographic reconstruction, which may be referred to as an 'intermediate' holographic reconstruction, on a holographic replay plane and is being projected towards a screen, diffuser or other plane, to form an image of the intermediate holographic reconstruction thereon. The intermediate holographic reconstruction may itself be formed in free space or it may, for example, be formed on a screen, such as a diffuser.

The detectors comprise, or are communicatively coupled to, a processor or fault detection circuit that is configured to compare a light signal that is detected by the detectors, for a particular hologram at a given time, to an expectation of a light signal that should have been detected, for that particular hologram at that time, if the holographic projector was operating accurately and safely. In particular, the method can determine whether the display device is correctly displaying the desired hologram, at a given time, based on the light signals from the holographic reconstruction and/or whether the light is at an eye-safe level of brightness or intensity. The method may further comprise controlling the light source to pause or stop irradiating (i.e. illuminating) the display device, or to change a parameter of the irradiating light, if there is an indication that it may not be functioning correctly. This can therefore act as a safeguard against eye damage and/or eye discomfort for an observer, which might otherwise arise if the display device was allowed to continue inaccurate or improper operation. In some cases, the method may comprise controlling the light source to reduce the intensity of irradiation. This could ensure eye safety while continuing to provide enough light to monitor to determine if/when the SLM (or other aspect of the projector) has recovered from its error state.

According to an aspect, a holographic projector is provided, comprising a spatial light modulator (SLM) arranged to display a hologram of a light pattern for projection and to spatially-modulate light, in accordance with display, to form a holographic reconstruction, wherein the holographic reconstruction is spatially-separated from the spatial light modulator. If the holographic projection is operating properly, the formed holographic reconstruction should correspond to the light pattern. The holographic projector also comprises a detector array comprising a plurality of light detection elements arranged to detect light corresponding to a respective plurality of positions of the holographic reconstruction and to provide a respective plurality of output signals related to light detection, and a fault detection circuit arranged to compare one or more of the plurality of output signals from the respective plurality of light detection elements with one or more of a plurality of expected signals based on the light distribution of the light pattern.

The fault detection circuit—or another processor or circuit that is comprised within or communicatively coupled to the holographic projector—may be arranged to determine, as a result of said comparison, whether a difference exists between the one or more of a plurality of output signals and the one or more of a plurality of expected signals.

The purpose of the comparison, made by the fault detection circuit, may be to assess the validity of the holographic reconstruction. The comparison may determine whether the holographic projector is operating safely, or whether there is a risk that it may not be. The comparison may compare an output signal from each of a plurality of light detection elements to an expected output signal from each of those light detection elements, at a given time or times. One or more of the expected time signals may be time-varying. For example, the time variation of the expected signals may be due to an expectation that the hologram will change, thereby changing the light pattern, and/or to an expectation that the light pattern will dynamically change position or location, thereby changing which part (if any) of the light pattern would be expected to occur at the location of a particular light detection element, at a given time or times. For example, the holographic reconstruction may be expected to be translated or "scanned" across a replay plane. In some cases, the identity of the detection element/s for which a light signal/s is expected may change, over time.

The plurality of output signals from the respective plurality of light detection elements (and/or the plurality of expected signals) may comprise a combined or concatenated signal, from the plurality (or a subgroup or subset of the plurality) of light detection elements in the detector array. For example, the light detection elements may be configured to provide binary signals, indicating the presence ('1') or absence ('0') of a light signal, at any given time. A concatenated signal may comprise a sequence of the binary outputs from each of a plurality of light detection elements (or a sequence of the expected binary outputs from those light detection elements.) The length, in bits, of such a concatenated binary signal may be equal to the number of light detection elements to which it relates. In another example, the light detection elements may be configured to provide non-binary ("greyscale") signals, which provide information on, for example, the intensity or brightness of the detected light.

The holographic projector may comprise, or be provided in conjunction with, a light source. The light source may be a laser light source. The light may be, for example, infra-red (IR) light, visible light or ultra-violet light.

The fault detection circuit may comprise, or be comprised within or communicatively coupled to, any suitable controller or processor. That controller or processor may also be configured to perform other actions, in relation to the holographic projector. For example, it may be arranged to control the selection and display of holograms on the spatial light modulator. The fault detection circuit may be referred to simply as a 'controller' or as a 'signal comparison circuit' or as any other appropriate term.

The fault detection circuit may be arranged to alter or to prevent further light projection, if it identifies a difference between said one or more output signals from the respective plurality of detection elements and the one or more expected signals, to ensure safe operation of the holographic projector. In some cases, it may be arranged to not entirely prevent further light projection, but to alter the light projection, for example by reducing its intensity. For example, the holographic projector may be arranged to prevent or reduce further light projection from a light source towards the spatial light modulator (SLM), and/or to prevent or reduce light being emitted by the SLM, and/or to prevent or reduce light that is emitted by the SLM from reaching its target object or scene, and/or to prevent or reduce light from being reflected from that scene or object, towards an observer, if it identifies a difference between said one or more output signals from the respective plurality of detection elements and the one or more expected signals. For example, the operation of the light source may be paused or dialed-down and/or the operation of the SLM could be paused or nullified, for example via the activation of a shutter or other barrier, located either between the light source and the SLM and/or between the SLM and a scene or target that it is otherwise arranged to illuminate, or even between the scene or target and the observer. In some cases, multiple barriers or shutters may be employed, for blocking the light path at multiple different respective locations or positions, between the light source and the observer.

The fault detection circuit may be arranged to tolerate certain differences, between one or more output signals from the respective plurality of detection elements and the one or more expected signals. For example, a difference may be tolerated (and, thus, further light projection allowed) if that difference is of a value (i.e. of a magnitude, or extent) that is not greater than an acceptability value. In other words; the fault detection circuit may allow certain differences to exist, up to a predetermined threshold, but may determine that differences that are of a value that exceeds that predetermined threshold are not acceptable, and so the further light projection must be stopped, reduced or paused, until the cause of those differences is investigated and, if appropriate, remedied. The fault detection circuit may be arranged to distinguish between differences of different respective types or natures. There may be some differences (or mis-matches) between a received signal and an expected signal that are deemed to be unacceptable, regardless of their magnitude, whereas other differences (or mis-matches) between a received signal and an expected signal may be deemed to be acceptable, and to present a low safety risk, if their magnitude is relatively small. In some cases, certain differences (or mis-matches) between a received signal and an expected signal may prompt the controller to reduce the intensity of the light but not to prevent it entirely, at least for a predetermined window of time, thus giving an opportunity for the source of the difference to be addressed and remedied, without the need to stop operation of the projector entirely during that time window.

In some arrangements, the type and/or the extent of a detected difference may determine (or contribute to a determination as to) which step or steps is/are taken, to block the light path, between the light source and the observer.

The holographic reconstruction of the light pattern, which a hologram represents, may be formed on a holographic replay plane in free space or on a screen such as a diffuser or in the eye of an observer. The holographic replay plane may be planar. In some cases, the holographic replay field may not be planar. For example, different spots within a holographic reconstruction may come into focus at different respective depths within the same three-dimensional (3D) image.

The light pattern that is represented by the hologram may be time-varying, such that one or more of the plurality of expected signals may also be time-varying. For example, the identity and/or the location of the light detection element or elements, within the detector array, that are expected to output a signal, related to light detection, may vary with time.

A sequence of light patterns may be represented by a corresponding sequence (or plurality, or series) of holographic reconstructions, which are formed by irradiating the SLM with light from a light source. Each light pattern in the sequence of light patterns may correspond to a different respective hologram. Alternatively, or additionally, two or more light patterns in a sequence of light patterns may correspond to a common hologram, combined with a different respective grating function for each different light pattern in the sequence. That is, the difference between two light patterns in a sequence may comprise a difference in the position or location of their respective holographic reconstructions (and their respective holographic replay fields) on a holographic replay plane.

Each light pattern of a sequence of light patterns for projection may be configured such that only one detection element of the plurality of detection elements should receive light corresponding to the holographic reconstruction of that light pattern, at a time. In some cases, the detection element that should receive light may change with each successive light pattern of the sequence of light patterns. In some cases, more than detection element may be expected to receive light at a time, but the specific combination of elements that are expected to receive light may change with each light pattern in the sequence of light patterns.

The detection elements may be located substantially at the holographic replay plane, at which an (intermediate) holographic reconstruction of the light pattern is formed. Alternatively, or additionally, some or all of the detection elements may be located at an image plane, at which an image of an intermediate holographic reconstruction is formed. Alternatively, or additionally, some or all of the detection elements may be located upstream of the holographic replay plane (i.e. between the SLM and the holographic replay plane) and/or downstream of the holographic replay plane (e.g. between the holographic replay plane and an image plane). Therefore, in some cases, the holographic reconstruction may not yet be fully formed, and/or may not be properly focused, at the location of one or more of the detection elements. For example, in some cases the holographic replay field may be located at the retina of the observer's eye, using the eye's lens as a Fourier lens to form the holographic reconstruction. Therefore, any monitoring of the light from the SLM would be upstream of the Fourier lens, in such an arrangement.

The plurality of positions, of the holographic reconstruction, for which there is a respective plurality of light detection elements, may be a plurality of positions of a part or parts of the holographic reconstruction itself. For example, they may comprise a plurality of positions that a light spot (or light spots) within a holographic reconstruction may move to, when a grating or other function is used to translate the holographic reconstruction on its holographic replay plane. For example, they may comprise a plurality of positions at which a light spot may (or may not) occur, within a holographic reconstruction, dependent on which one of a selection of possible holograms is irradiated, at a given time.

The plurality of light detection elements may be arranged to detect light 'corresponding to' a respective plurality of positions of the holographic reconstruction in the sense that the light detection elements may not actually be located at the holographic reply plane, at which the holographic reconstruction is fully formed and focused. Instead, they may be at another plane, which may be parallel to the holographic reply plane. In other words, they may be located at a different point in the trajectory or lightpath of the light, other than at the holographic replay plane. The light detection elements may detect light that is travelling towards a holographic replay plane, to form a holographic reconstruction, and/or light that is being projected onwards from its holographic replay plane, having already formed a holographic reconstruction.

The light detection elements may be located at positions at which the light that may form (or may have formed) one or more light spots within a holographic reconstruction would be expected to be present, at least at certain times or under certain circumstances. Therefore, the light detection elements may be located on a plane that is upstream of the holographic replay plane for a particular holographic reconstruction, at a respective plurality of positions at which light may be detected, wherein that light is on a trajectory (or lightpath) towards the holographic replay plane, where it may form one or more light spots within the holographic reconstruction. Alternatively, or additionally, the light detection elements may be located on a plane that is downstream of the holographic replay plane for a particular holographic reconstruction, at a respective plurality of positions at which light may be detected, wherein that light is on a trajectory (or lightpath) away from the holographic replay plane, and wherein that light may have previously formed one or more light spots within the holographic reconstruction.

The light pattern for projection may comprise a primary light pattern region and a secondary light pattern region. Each position of the plurality of positions, at which the light detection elements are arranged to detect light, may be within the secondary light pattern region.

The secondary light pattern region may be different to the primary light pattern region, optionally, for example, the second light pattern region may be spatially-separated from the primary light pattern region. For example, the primary light pattern region may comprise image content that is intended to be viewed by a viewer. Conversely, the secondary light pattern region may not comprise image content that is intended to be viewed by a viewer. For example, the hologram may be a hologram of a target image, wherein the primary light pattern corresponds to the image content of the target image and the secondary light pattern corresponds to additional hologram content. For example, the hologram may be a hologram of a modified target image, which has a marker or identifier added to the original image content. The primary light pattern region may correspond to the original image content of the target image and the secondary light pattern may correspond to the added marker or identifier. The added marker or identifier may be referred to as being a "holographic fingerprint".

A block, or baffle, or barrier may be provided, to prevent light within the secondary light pattern region from being transmitted substantially beyond the holographic replay plane. An aperture or opening or window may be provided to allow light within the primary light pattern region to be transmitted substantially beyond the holographic replay plane.

Both the secondary light pattern region and the primary light pattern region may be comprised within a common order of holographic replay field, on the holographic replay plane. For example, they may both be comprised within the zeroth-order holographic replay field.

Alternatively, the secondary light pattern region and the primary light pattern region may be comprised within different respective orders of holographic replay field, on the holographic replay plane. For example, the primary light pattern region may be comprised within the zeroth-order holographic replay field and the secondary light pattern region may be comprised within a first-order holographic replay field.

The locations of the plurality of positions that are respectively monitored by the plurality of detection elements may coincide with the secondary light pattern region. If the detection elements are provided upstream of the holographic replay plane, the plurality of positions that are respectively monitored by the plurality of detection elements may coincide with the light that will form the secondary light pattern region when it reaches the holographic replay plane. If the detection elements are provided downstream of the holographic replay plane, the plurality of positions that are respectively monitored by the plurality of detection elements may coincide with the light that previously formed the secondary light pattern region, on the holographic replay plane. The locations of the plurality of positions that are respectively monitored by the plurality of detection elements may therefore be within the zeroth-order holographic replay field or may be within a higher-order repeat of a zeroth-order holographic replay field. The plurality of positions within a higher-order repeat may be substantially adjacent to the zeroth-order holographic replay field.

If the plurality of positions that are respectively monitored by the plurality of detection elements are within a higher-order repeat of a zeroth-order holographic replay field, the detector array may be substantially coplanar with, or substantially perpendicular to, the holographic replay plane.

The light pattern may comprise an array of light spots for light detection and ranging, "LIDAR". The holographic projector may be comprised within a LIDAR system, for observing or interrogating a scene or target.

A LIDAR controller may be provided and arranged to move or change a holographic replay field, in which a holographic reconstruction is formed, in time, such that each light spot of the array of light spots effectively occupies a plurality of different positions on the holographic replay plane during a scan period. The array of light spots moves as a whole, when the holographic replay field is moved or changed. The movement of the light spots to their different positions during the scan period may correlate with the plurality of positions respectively monitored by the plurality of detection elements. In other words, the plurality of detection elements may be located to capture a light signal from one or more specific light spots, within the array of light spots, as it/they move(s) around.

For example, a light spot (or spots or other light form) that does not contribute to the 'main' array of light spots that is used for light detection and ranging (LIDAR), but is nonetheless comprised within the same holographic reconstruction that includes the 'main' array of light spots, may move between two or more of the monitored plurality of different positions on the holographic replay plane, during a scan period. That light spot (or spots or other light form) may comprise a holographic identifier or 'fingerprint' for a holographic reconstruction. One or more characteristic(s) of the fingerprint may be monitored, for determination of whether the holographic projector is operating correctly, at a given time. One or more signals that are generated due to the detection of the fingerprint, or part of the fingerprint, may be monitored and may be compared to one or more corresponding expected signals, for determination of whether the holographic projector is operating correctly and safely, at a given time.

The detection of light by at least one detection element of the plurality of detection elements may be used to trigger the start of a time-of-flight measurement using a light spot of the array of light spots.

The light pattern may be an image for a head-up display.

According to an aspect, a method is provided of monitoring operation of a holographic projector, the holographic projector comprising: a spatial light modulator arranged to display a hologram of a light pattern and to spatially-modulate light to form a holographic reconstruction, wherein the holographic reconstruction is spatially-separated from the spatial light modulator; a detector array comprising a plurality of light detection elements arranged to detect light at a respective plurality of positions of the holographic reconstruction and to provide a respective plurality of output signals related to light detection; and a fault detection circuit. The method comprises displaying, at the spatial light modulator, a hologram of a light pattern; illuminating the spatial light modulator, to form a holographic reconstruction of the light pattern; detecting, at the detector array, a light signal corresponding to the holographic reconstruction; receiving, at the fault detection circuit, an output signal from a light detection element, within the detector array, relating to the detected light signal corresponding to the holographic reconstruction; and comparing the received output signal with one or more of a plurality of expected signals, which are based on the light distribution of the light pattern.

The one or more of a plurality of expected signals may be time-varying. The light pattern for projection may comprise a primary light pattern region and a secondary light pattern region, wherein each position of the plurality of positions may be within the secondary light pattern region.

If the holographic projection is operating properly and safely, the formed holographic reconstruction should correspond to the light pattern. The fault detection circuit may be arranged to have stored thereon, or to have access to, the plurality of expected signals, which would be expected to be received from the detector array, if the holographic projector was operating correctly, and properly forming the holographic reconstruction(s) of one or more particular light patterns, which are represented by one or more corresponding holograms, displayed on the spatial light modulator (SLM). The fault detection circuit may be arranged to access one or more particular expected signals, which correspond to the light pattern for a currently-displayed hologram, and to compare the received output signal from the light detection element to that one or more particular expected signals.

The method may further comprise the fault detection further determining, as a result of said comparison, whether any difference exists between the received output signal and the one or more of a plurality of expected signals, and optionally also determining whether that difference is greater than an acceptability value.

The method may further comprise controlling the holographic projector so that, if it is determined that a difference exists between the received output signal and the one or more of a plurality of expected signals, and/or if it is determined that a difference exists that is greater than an acceptability value, further light projection is altered or prevented. The alteration or prevention of the further light projection may comprise taking steps to stop or pause illumination of the SLM by a light source, or to change a parameter of the illumination, and/or it may comprise activating one or more barriers or shutters, along the light path, within the holographic projector, between the light source and the observer.

The holographic projector according to any of the above aspects may be comprised within a light detection and ranging, "LIDAR", system.

The method according to any of the above aspects may be a computer-implemented method.

A computer program may be provided comprising instructions which, when executed by data processing apparatus, causes the data processing apparatus to perform a method according to any of the above aspects.

A computer readable medium may be provided, storing a computer program according to the above aspect.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different examples, arrangements, aspects, embodiments and groups of embodiments may be disclosed separately in the detailed description which follows, any feature of any examples, arrangement, aspect, embodiment or group of embodiments may be combined with any other feature or combination of features of any embodiment or group of embodiments. That is, all possible combinations and permutations of features disclosed in the present disclosure are envisaged.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
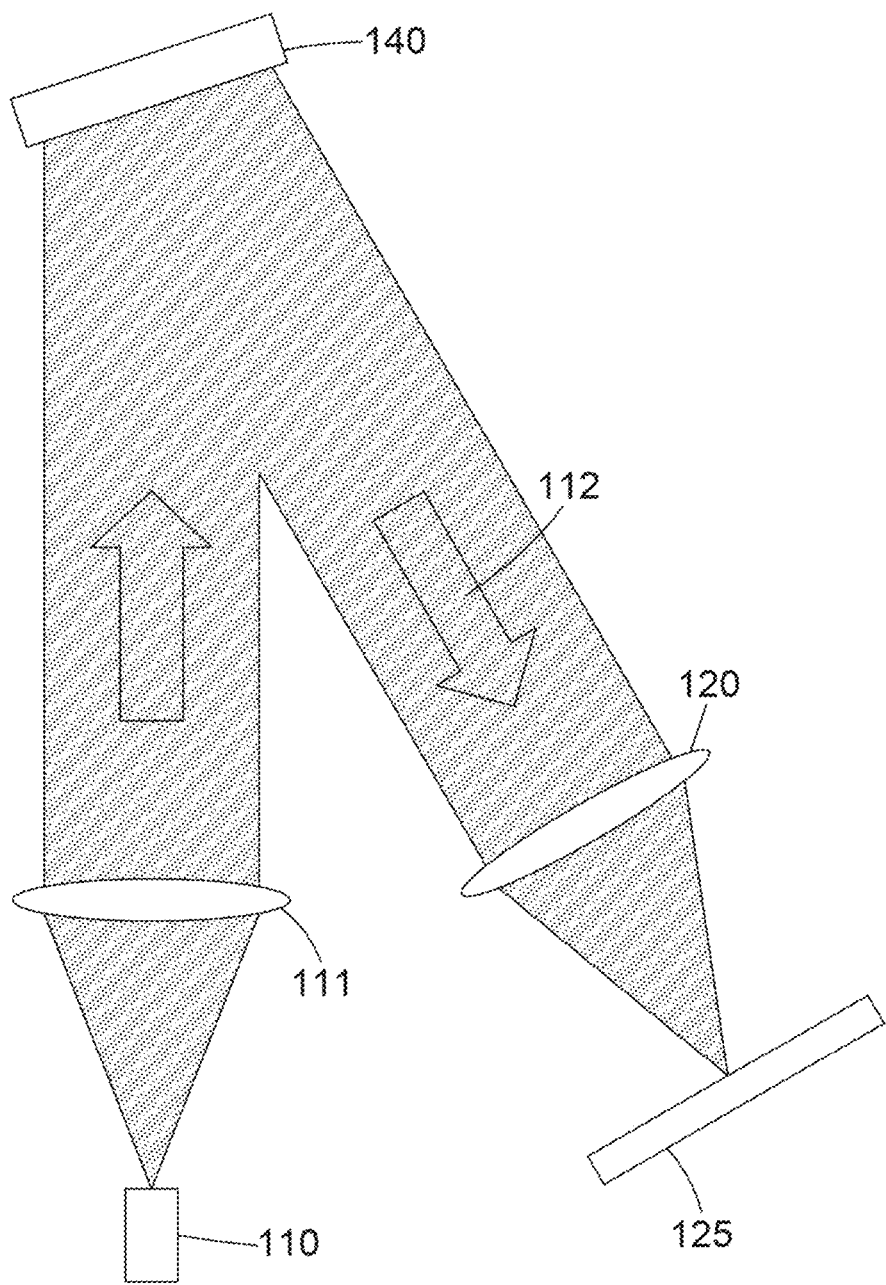
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, IA(x, y) and IB(x, y), in the planes A and B respectively, are known and IA(x, y) and IB(x, y) are related by a single Fourier transform. With the given intensity cross-sections, an approximation to the phase distribution in the planes A and B, $\Psi A(x, y)$ and $\Psi B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x, y) and IB(x, y), between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
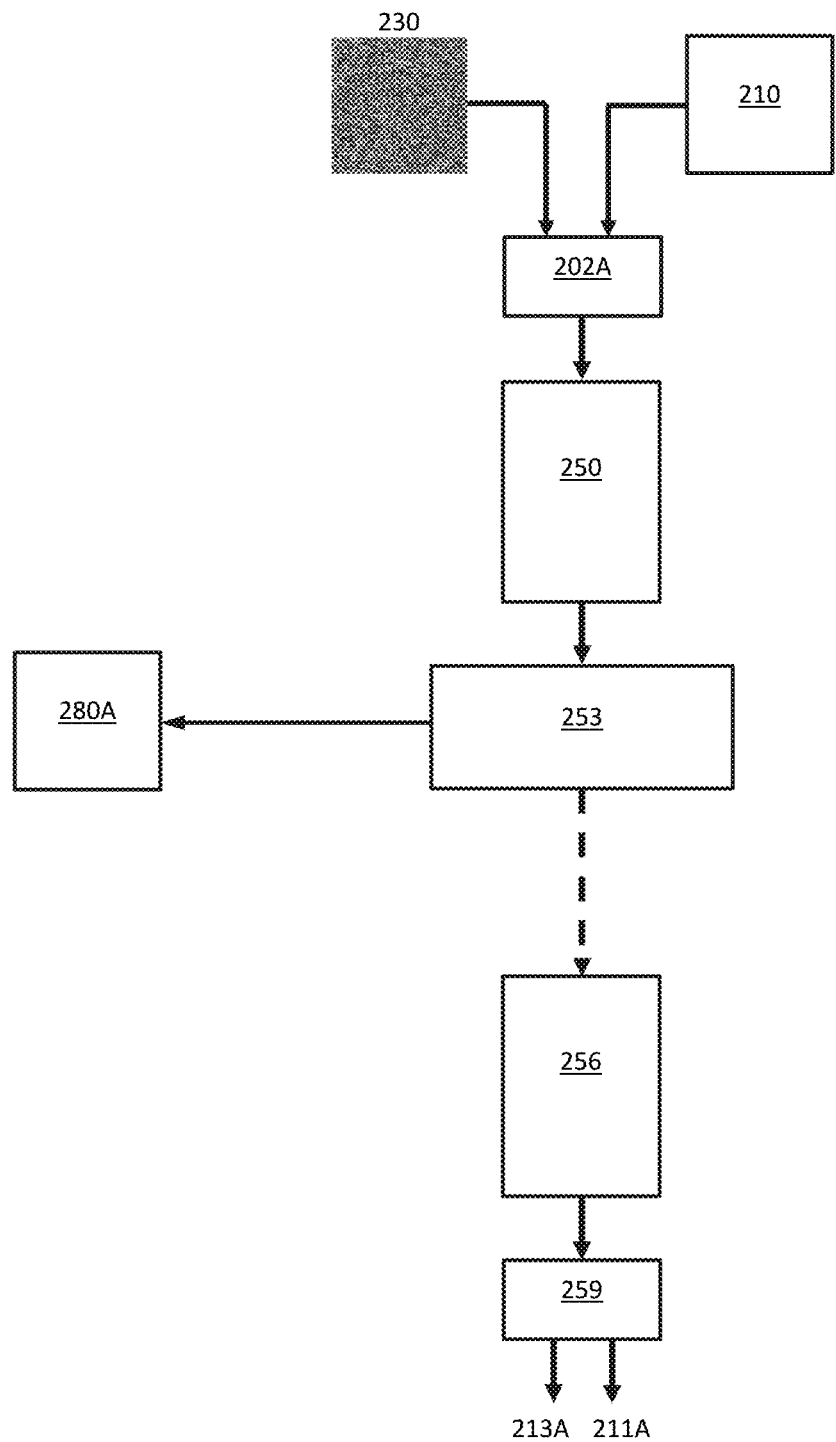
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
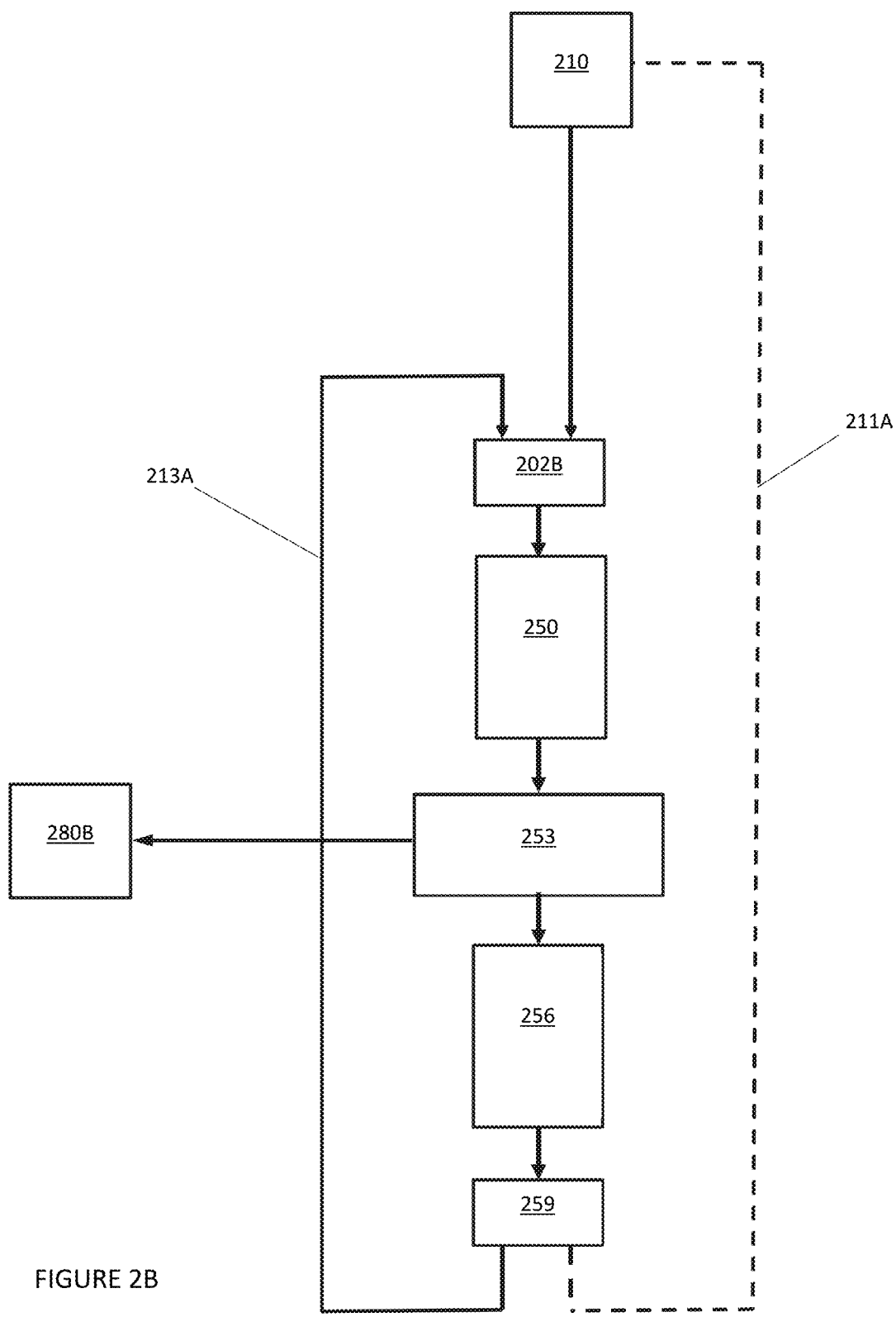
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
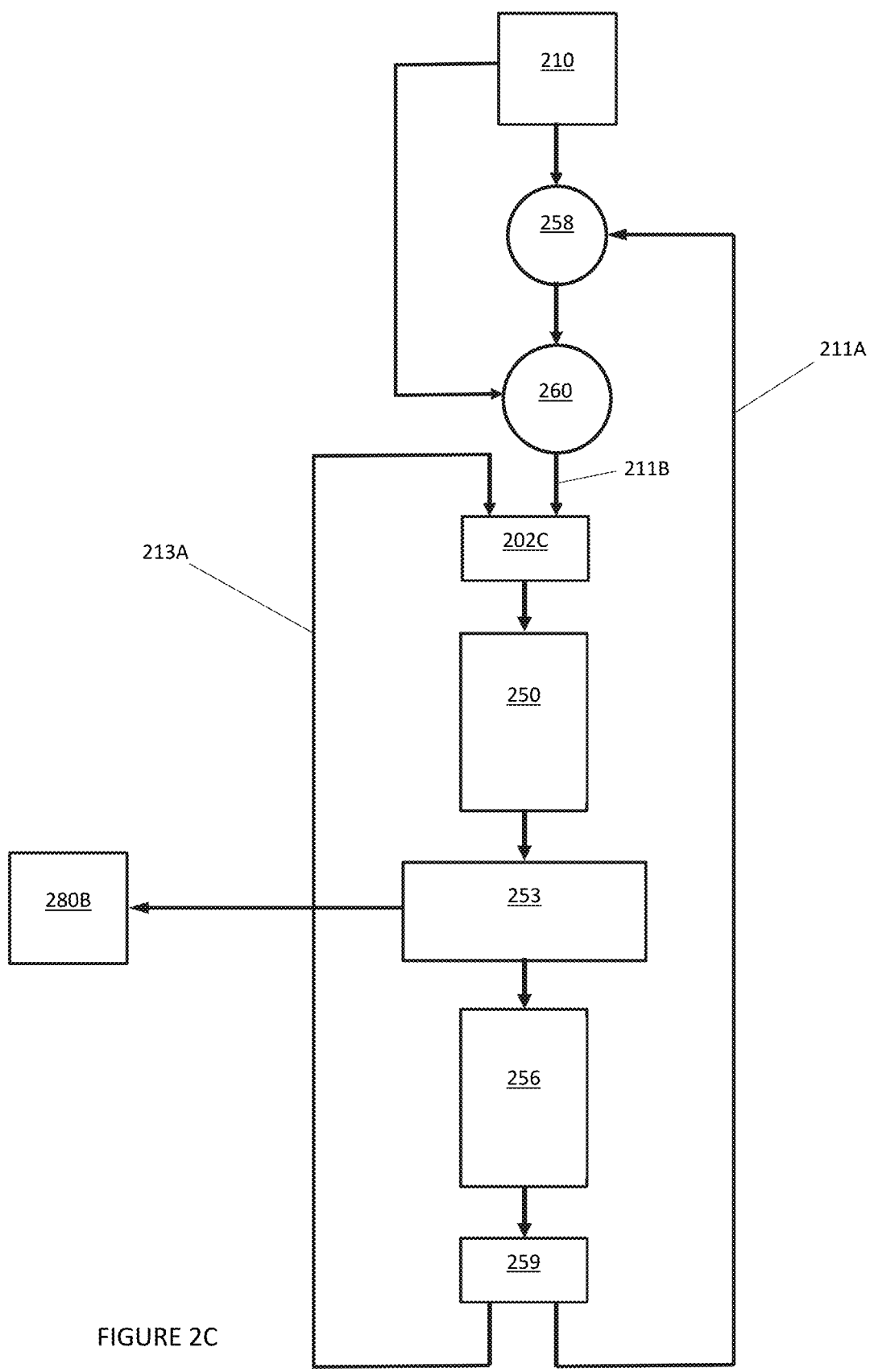
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
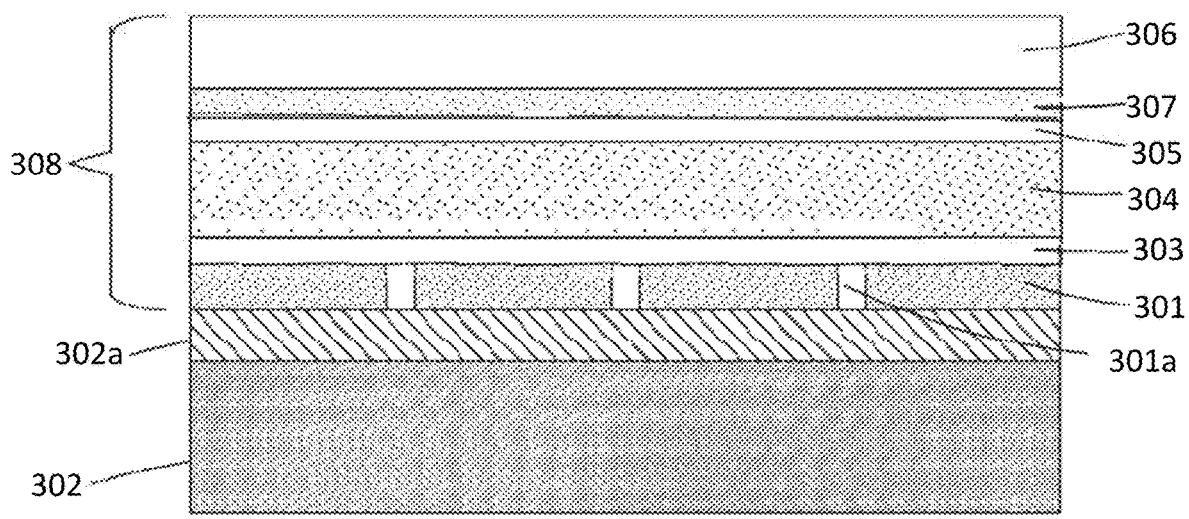
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Light Detection and Ranging ('LIDAR' or 'LiDAR') Systems

It has previously been disclosed that holographic components and techniques, such as those described herein, may be used to form the basis of a Light Detection and Ranging (LIDAR) system. The skilled person will be aware that, in general terms, LIDAR describes arrangements and methods in which the distance to a target may be measured by illuminating the target with pulsed laser light and measuring a parameter associated the light that is reflected from the target, using a sensor or detector. For example, the return times of the reflected light can be measured and may be used to form representations, such as three-dimensional (3D) representations, of the scene or a target within the scene.

WO2019/224052 discloses a holographic projector used to illuminate a target, or scene, or plane, using so-called 'structured light', in order to observe or interrogate that target (or scene or plane) as part of a LIDAR system. For example, the structured light may be characterised by having a particular form and/or shape and/or pattern. The pattern of the structured light arises from the hologram that is displayed by a spatial light modulator and illuminated by a laser light source, within the holographic projector. A holographic projector may be arranged to illuminate a plurality of different holograms in sequence (i.e. one after the other), to dynamically change the structed light pattern that is formed on the target.

Figure 4:
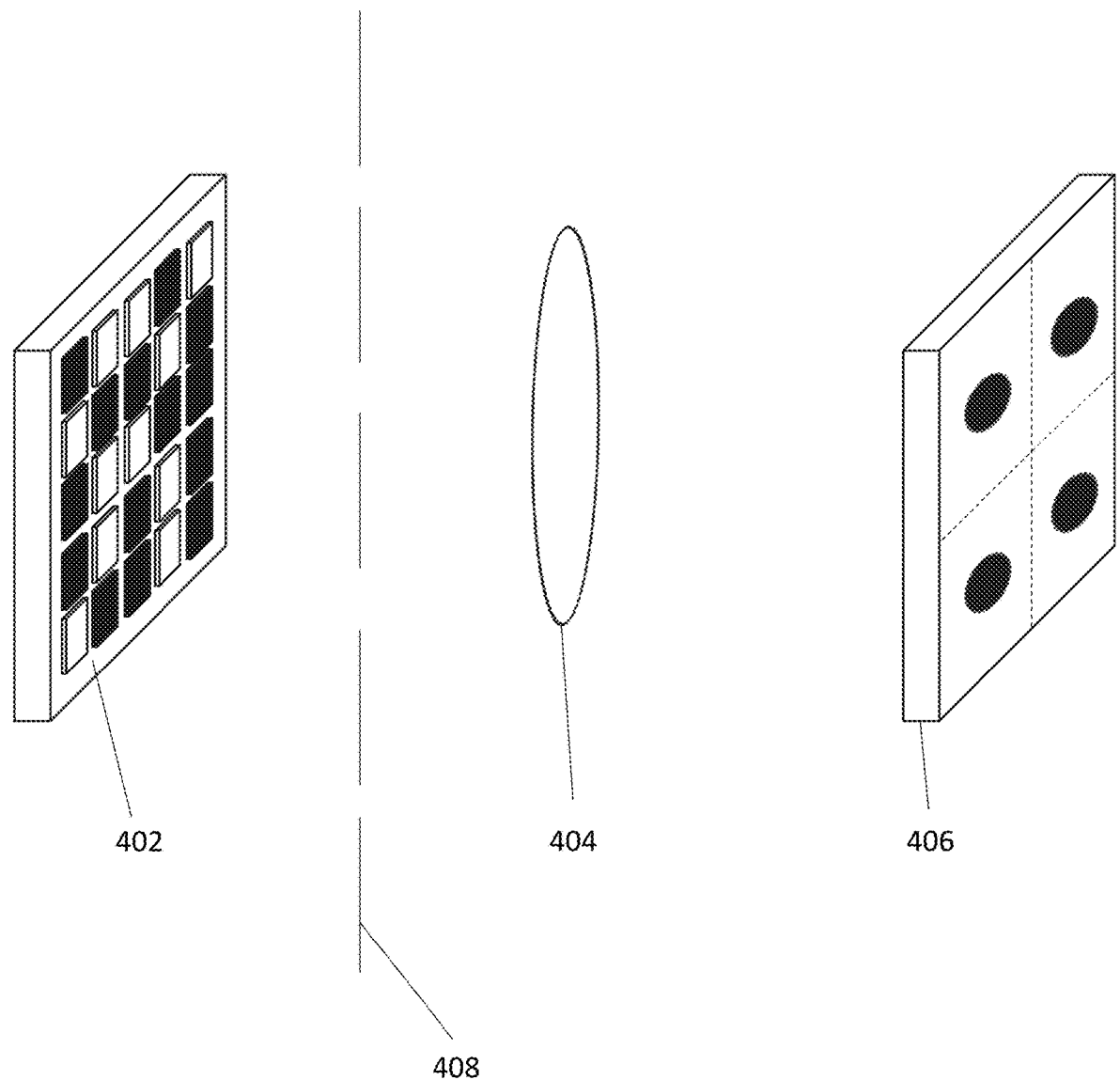
FIG. 4 is a schematic of a light source system, or holographic projector, that may be employed as part of a holographic Light Detection and Ranging (LIDAR) system.
Figure 5:
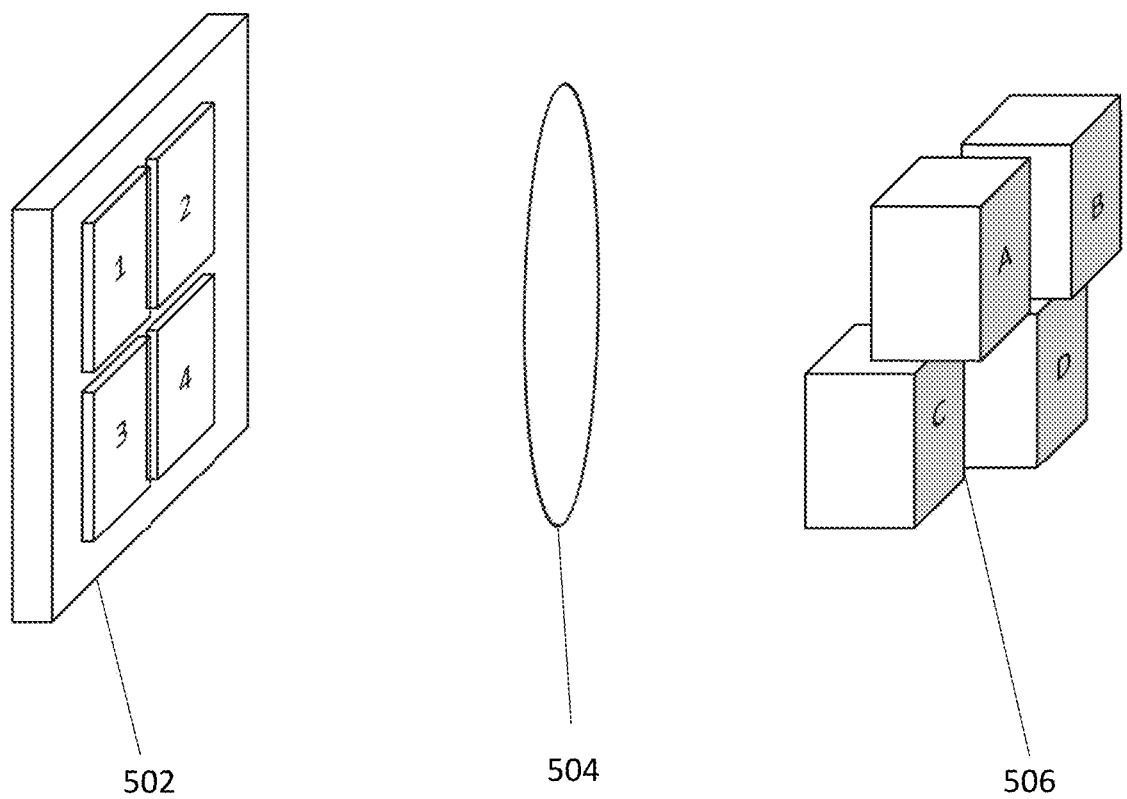
FIG. 5 is a schematic of a light detector system that may be employed as part of a holographic Light Detection and Ranging (LIDAR) system.
Figure 6:
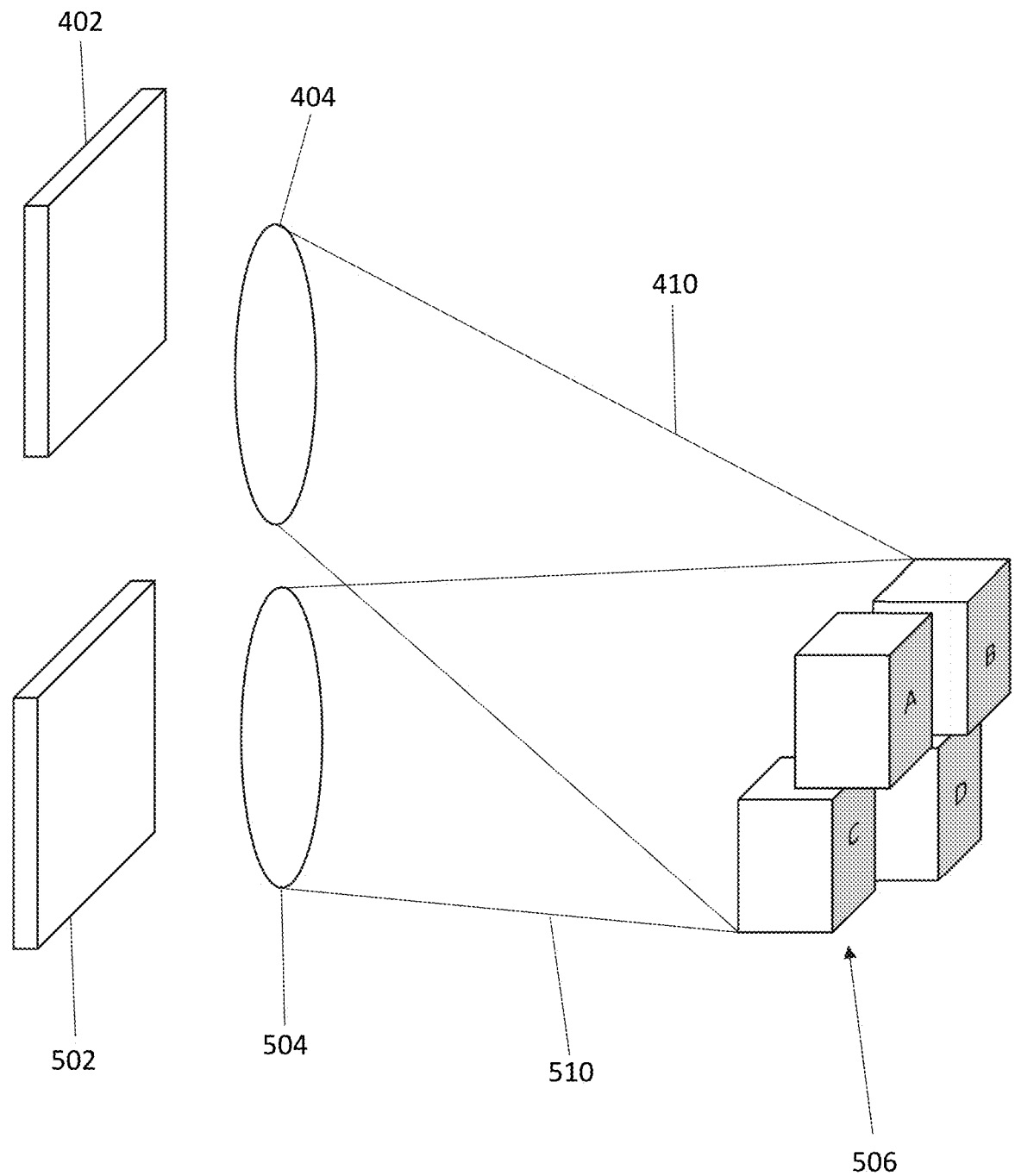
FIG. 6 is a schematic of a combined light source and detector system that may be employed as part of a holographic Light Detection and Ranging (LIDAR) system.

LIDAR may be further understood by reference to FIGS. 4 to 6 herein, and to the following description.

FIG. 4 shows, by way of example only, a light source system or 'holographic projector' arranged to project a structured light pattern. The light source system comprises a spatial light modulator (SLM) 402 comprising an array of pixels that are configured to display a hologram. In FIG. 4, the SLM 402 is shown as having a 5×5 array of pixels (i.e. 25 pixels in total) but it will be appreciated that this is merely illustrative and that the number and arrangement of pixels may vary from the particular example shown.

In FIG. 4 there is also a projection lens 404, via which light travels from the SLM 402, towards a replay field 406. The replay field 406 may comprise, for example, a light receiving surface such as a screen or diffuser. The replay field 406 may comprise, for example, a real-world target object or scene. The light source system may be arranged to interrogate' or observe a real-world target object or scene and/or to obtain one or more measurements in relation to it and/or to provide target illumination of one or more features within a real-world target or scene.

The SLM 402 is arranged to received light from a light source (not shown) such as a laser diode, in order to irradiate the hologram. The hologram in this example is a computer-generated hologram. The SLM 402 is arranged to receive, and to be encoded with, a computer-generated hologram from a suitable controller (not shown). The SLM 402 may be arranged to receive a plurality of different computer-generated holograms and to store, or otherwise have access to, those holograms for display at different respective times.

Although not shown in FIG. 4, a Fourier Transform (FT) lens may be included in the light source system, to form a holographic reconstruction of the irradiated hologram, at a holographic replay field. The 'holographic replay field' is a two-dimensional area (within a 'holographic replay plane') within which a holographic reconstruction of a desired light pattern is formed, upon irradiation of a corresponding hologram. Such an FT lens could be a physical lens (not shown in FIG. 4), or a software lens formed on the SLM or a combination of a software lens and a physical lens. The skilled reader will be familiar with FT lenses and their role in forming holographic reconstructions of holograms, and therefore no further description of this feature is provided herein.

In some arrangements, the holographic reconstruction of the irradiated hologram may be formed downstream of SLM 402, such as in free space at an intermediate holographic replay field 408 that is located between the SLM 402 and the projection lens 404. In such embodiments, the projection lens 404 forms an image of the intermediate holographic replay field 408, and projects it onto the holographic replay field 406 that is used for light detection and ranging. It will therefore be understood that holographic replay field 406 is actually an image of the intermediate holographic replay field 408 formed by projection lens 402. In some embodiments, the image of the holographic replay field 406 formed by projection lens 402 may be a magnified image of the intermediate holographic replay field 408. In these arrangements, the term "replay field" is generally used to refer to the image of the intermediate holographic replay field 408 because that is the replay field that is actually used.

In some other arrangements, the projection lens 404 contributes to the (optical) Fourier transform of the hologram displayed on the SLM 402, and therefore the holographic replay field is located downstream of both the SLM 402 and the projection lens 404.

In the system of FIG. 4, the replay field 406 comprises a plurality of discrete light areas—in this example, there are four discrete light areas, but it will be appreciated that the number of discrete light areas may vary from the example shown.

Irradiation of the hologram in FIG. 4 results in a holographic reconstruction (and an image of that holographic reconstruction) that, in this example, comprises four discrete light spots; one in each of the four discrete light areas of the replay field 406. This light pattern is considered to be so-called 'structured light' because it comprises a plurality of discrete light features or sub-footprints that provide light in a corresponding plurality of discrete areas (or sub-areas) of the replay field 406. It will be appreciated that any pattern of discrete light features, such as light spots, separate by areas of darkness, may be formed and the brightness of each light feature or spot may be individually tuned, based on the selection and irradiation of an appropriate respective hologram, on the SLM 402, at any given time.

In FIG. 4, the four discrete light spots are shown as being in fixed positions, within their respective discrete light areas of the replay field 406. In some arrangements, light spots (or other light formations) will not remain fixed in position but may be moved or scanned, around respective areas, for example using a software grating. This is discussed in more detail in relation to subsequent figures, later in this description.

In the example shown in FIG. 4, there is not a one-to-one correlation between the pixels of the hologram and the light features (or discrete light areas) of the replay field 406. Instead, all the hologram pixels contribute to all areas of the replay field 406. The structured light pattern within the replay field may be used to interrogate the scene, for example to help form an accurate image or model (or series of images or models) of the scene and/or to make measurements of the scene.

The scene that the light source system (or holographic projector) is arranged to direct structured light onto may not be planar but may have a depth. The holographic projector may therefore be arranged to dynamically adjust its operating parameters in order to vary the precise location of the replay field 406 and holographic replay plane, to explore different respective depths within the scene. A lensing function may be added to the hologram 402, in order to maintain focus of the structured light pattern on the plane of interest, at any given time. In some cases, the holographic replay field may, itself, not be planar, and thus may comprise light spots that are arranged to come into focus at different respective depths within the same 3D reconstruction (or image). The light source system (or holographic projector) may comprise a lens or other suitable optics to ensure that it has some inherent depth of field or depth of focus, with respect to any plane of interest that is being explored, at a given time.

The distance between the SLM (and the hologram) of a holographic projector and the plane of interest may be referred to as the 'range'. The range may be measured along a (virtual) line that joins the centre of the SLM (and of the hologram) to the centre of the zeroth-order replay field. This line may be referred to as a 'projection axis.' Therefore, it may be said that the holographic projector of FIG. 4 may be controlled (for example, using a lensing function or a plurality of lensing functions) so as to vary the range along its projection axis, to enable observation of multiple planes, and thus multiple depths, with a target or scene. This is discussed further below, in relation to subsequent figures.

FIG. 5 shows a light detector system that comprises a light detector 502 and an imaging lens 504. The light detector 502 comprises a plurality of individual light detection elements arranged in an array. There are four light detection elements in the example shown in FIG. 5, wherein those light detection elements are respectively numbered 1 to 4. The skilled person will appreciate that this number of light detection elements is merely an example, and that other sizes and arrangements of array and other numbers of light detection elements are contemplated.

The light detector 502 may comprise, for example, a charge-coupled device (CCD) camera, comprising an array of CCD elements. Alternatively, the light detector 502 may be a single-photon avalanche diode (SPAD) array comprising an array of SPAD elements.

The light detector 502 is arranged to receive reflected light from a target or scene 506 that is to be interrogated or observed. The light from the observed scene 506 travels, via the imaging lens 504, towards the light detector 502.

The light detector 502 may comprise, or may be communicatively coupled to, a suitable controller. The controller may be configured to process light detection signals from the light detector 502 in order to obtain measurements of, or make other determinations relating to, the observed scene 506, as will be discussed further below in relation to subsequent figures.

In the arrangement of FIG. 5, the observed scene 506 comprises objects labelled A, B, C and D. Each individual light detection element (1, 2, 3, 4) of the light detector 502 in FIG. 5 is arranged to receive light from a single respective corresponding object (A, B, C, D) in the observed scene 506. Each light detection element in the example of FIG. 5 is arranged only to receive light from its corresponding object and thus not to receive light from any of the 'other' objects within the observed scene 506. That is; the optics of the light detector system are arranged so that, for example, element 1 receives light from object A only, element 2 receives light from object B only, element 3 receives light from object C only and element 4 receives light from object D only. It may therefore be said that there is a one-to-one correlation between an individual light detection element (1, 2, 3, 4) and its corresponding object (A, B, C, D) within the observed scene 506, although the light detection elements and the objects may have different respective sizes. Alternatively, element 4 may receive light from object A only, element 3 may receive light from object B only, element 2 may receive light from object C only and element 1 may receive light from object D only Although A, B, C and D are represented in FIG. 5 as being particular geometric formations (cuboids), it should be appreciated that this is illustrative only, and should not be regarded as limiting. In practice, the individual light detection elements (1, 2, 3, 4) of the light detector 502 may be configured to have one-to-one correlation with respective regions or areas (or sub-regions or sub-areas) of a scene or target, from which light is reflected towards the light detector 502. The light detection elements may therefore be configured to receive reflected light from whatever object(s) or formation(s) or being(s) is/are present at the corresponding regions of the scene, at a given time. For succinctness in the present disclosure, whatever is present in a particular region of a scene, at a given time, is referred to as being an "object". The skilled person will understand that each "object" may actually be a different area of the same object—e.g., car or tree.

In accordance with this disclosure, it is also said that each light detection element (1, 2, 3, 4) has a respective or corresponding individual field of view of the scene (A, B, C, D respectively). For example, the individual field of view of light detection element number 1 of FIG. 5 enables it to detect reflected light from an object within individual field of view A but does not enable it to detect reflected light from an object within individual field of view B, C or D. In some embodiments, the individual fields of view (e.g. A, B, C, D) are non-overlapping. In embodiments, the individual fields of view collectively provide substantially continuous coverage of an area of the scene. However, the person skilled in the art will appreciate that, in practice, there may be "dead zones" between the individual fields of view within which light cannot be detected by the system. The skilled person will understand how the imaging lens 504 plays the role of establishing the one-to-one correlation between each light detection element (1, 2, 3, 4) and individual field of view (A, B, C, D). It is known in the field of imaging how to design the imaging lens and any number of different imaging lens may be used depending on operating parameters of the system. The skilled person will also appreciate that the imaging lens 504 provides a depth of field such that light detection and ranging of each "object" (A, B, C, D) of FIG. 5 may be conducted at the same time. In other words, the "range" referred to in this disclosure includes a tolerance—for example, the range may be 100+/−2 metres, wherein the +/−2 metres reflects the depth of field. This example is illustrative and should not be regarded as limiting—other sizes of range and other depths of filed are contemplated. For the avoidance of doubt, continual adjustment of e.g. the software lens function is not required in order to perform light detection and ranging in relation to the four "objects" (A, B, C, D) shown in FIG. 5 because of the depth of field provided by imaging lens 504.

The skilled person will understand that various types of optical system may be used to provide the one-to-one correlation between an individual light detection element and its corresponding individual field of view within the observed scene 506. For example, in embodiments, the optical system may comprise a single lens (as in a camera), or a micro-lens array where each micro-lens is associated with an individual detector. But any suitable photodetector comprising an array of light sensing elements is possible and may be used for this purpose.

It can be seen that not all of the labelled objects (A, B, C, D) are located at the same distance from the light detector 502 as the respective others, in FIG. 5. In this example, object C is closest to the light detector 502, objects A and D are the next-nearest, at the same distance from the light detector 502 as one another, and object B is the furthest from the detector 502. The light detector 502 and/or a controller that is communicatively coupled to the light detector 502 (not shown in FIG. 5) may be configured to account for the different respective depths of one or more objects within an observed scene. This is discussed for example in GB patent application no. 2002276.0, as filed by the current applicant, the entirety of which is incorporated herein by reference. However, the methods disclosed therein are not the main focus of the present disclosure and so are not repeated herein.

FIG. 6 shows a combined system, comprising a holographic projector (or light source) and a light detector, similar to the holographic projector and light detector systems shown, respectively, in FIGS. 4 and 5. The holographic projector comprises an SLM 402 and a projection lens 404. The holographic projector further comprises a Fourier transform lens (not shown) arranged to form a holographic reconstruction in free space (so also not shown) between the SLM 402 and the projection lens 404. As explained above, the projection lens 404 forms an image of the 'intermediate', free space, holographic reconstruction. That image may be a magnified image, and comprises the structured light pattern of the intermediate holographic reconstruction, projected onto the scene 506. There is also a source of light, upstream of the SLM 402, arranged to transmit light towards the SLM 402, which is not shown in FIG. 6. The light may be infra-red (IR) light, visible light or ultra-violet light, dependent on application requirements. In embodiments related to LIDAR, the light source may be infra-red. In embodiments related to head-up display, the light source may be visible.

The SLM 402 and projection lens 404 are decentred in FIG. 6. This is to enable the holographic light cone 410, travelling from the projection lens 404 towards an observed scene 506, to partially overlap with the reflected structured light cone 510, travelling from the scene 506 back towards the imaging lens 504 and light detector 502.

In FIG. 6, the holographic light cone 410, which has exited the SLM 402 and travelled through the projection lens 404, is shown travelling towards the observed scene 506. The light is described as being 'holographic' because it comprises light that has been encoded by a hologram on the SLM 402, and thus has formed a structured light pattern, which illuminates the observed scene 506. The light is then reflected from the scene, towards a light detector 502. As described above in relation to FIG. 4; the SLM 402 may be configured to display a plurality of holograms, at different respective times. In some arrangements, the SLM 402 may be configured to display a sequence (or series, or plurality) of holograms, one after the other, so that multiple different structured light patterns are formed on the observed scene 506, one after the other As was the case in the arrangement of FIG. 5, discussed above, not all of the labelled elements, or 'objects', in the observed scene 506 are located at the same distance from the light detector 502 as the respective others. Instead, object C is closest to the light detector 502, objects A and D are the next-nearest, at the same distance from the light detector 502 as one another, and object B is the furthest from the light detector 502. The projection lens 404 is arranged such that the structured light pattern, which it forms on the observed scene 506, is "in-focus" on each of A, B, C and D at the same time, despite them not being co-planar with one another. The holographic light 410 is reflected by the objects A, B, C and D within the observed scene 506 and the resulting reflected light 510 travels towards the imaging lens 504 and on towards the light detector 502. As described in relation to FIG. 5, above, the light detector 502 in FIG. 6 comprises an array of light detection elements, which have a one-to-one correlation with the objects (A, B, C, D) in the observed scene. It will be appreciated that other types of scene, with different respective numbers and arrangements of objects, and light detectors having a different array of light detection elements, are also contemplated.

Although not explicitly illustrated in FIG. 6, the light detection elements of the light detector 502 may be arranged to each output a light response signal, when reflected light is received, at the light detector 502, from the observed scene 506. As the skilled reader will be aware; the structured light pattern from the holographic projector may be ON-OFF gated to create a sequence of "display events". Optionally, each display event may correspond to a different hologram and therefore to a different structured light pattern. An ON-OFF gated structured light pattern from the holographic projector may give rise to switching of the light response signals output from the light detectors 502. The light response signals may be transmitted to a processor or controller, for use in computation and/or for storage or display purposes. Thus, for example, a time of flight (TOF) value may be calculated for light travelling to and/or from each object (A, B, C, D) within the observed scene 506, based on the light response signal output by the corresponding light detection element.

The arrangement of FIG. 6 may thus be provided as part of a light detection and ranging, "LIDAR", system, which can be arranged to scan or survey a scene.

In holographic projectors, as with many other laser-based applications, safety is an important consideration. The power emitted by a laser within a holographic projector system should generally be controlled to be within a predetermined safety limit, such as an "accessible emission limit" (AEL). This is to ensure safe operating levels for the equipment within the system and to ensure eye safety for any users or other observers. In certain systems, such as a LIDAR system, for example a direct-view head-up display (HUD), comprised within a vehicle, in which the observer (the vehicle driver) effectively looks directly at a spatial light modulator (SLM) that is illuminated by a laser light source, the laser may be further controlled to ensure that the driver is not 'dazzled' by the illuminated SLM, and thus can continue to drive safely.

A potential safety risk for a holographic projector system is the risk of the SLM—which may, for example, be a Liquid Crystal on Silicon (LCOS) SLM, as described above—failing to display a hologram correctly, such that the illuminating laser light would not be distributed as intended. For example, if the SLM is an LCOS SLM, and if it erroneously provided uniform phase to all LCOS pixels, prior to application of a software lens, then the laser emission would be concentrated into a single spot because the lens would focus the uniform illumination to a spot, just like a physical lens. Such a concentration of laser light could—in some examples—be damaging to the eyes of the observer. Laser safety classification rules therefore typically require engineering controls in case of a 'scanning system' failure, such as an LCOS failure of this type.

The skilled reader will appreciate that, whilst monitoring and controlling laser emissions in a holographic projector system is necessary for safety reasons, in practice there is a demand for it to be balanced against efficiency and smooth operation of the system, from a user perspective.

There are known laser monitoring techniques, some of which may be applied to holographic projector systems. For example, WO2018/100395 describes a method in which a secondary holographic image is provided, alongside a primary holographic image, wherein the secondary holographic image does not comprise information intended for the observer of the primary image, but may be used to obtain a measure of optical power.

The present inventor has recognised that it is possible to accurately and efficiently monitor the operation of a holographic projector without causing interruption to its core functionality. In general terms; a detector or detection system may be provided, for detecting a holographic identifier that is located outside an aperture, or other viewing area, on a holographic replay field on which a holographic reconstruction is formed, when an SLM comprising a hologram is illuminated (or 'irradiated') by laser light. The holographic identifier may be comprised within the zeroth-order holographic replay field, on a holographic replay plane, or it may be comprised within a higher-order repeat of the zeroth-order holographic replay field, on the holographic replay plane. This will be better understood from the detailed examples below.

The holographic identifier may be time-varying, wherein its position and/or another detected characteristic, and/or a signal generated due to the detection of part or all of the fingerprint, would be expected to vary in a particular manner, between different respective times, if the SLM was functioning correctly. The detector may comprise or may be communicatively coupled to a controller, for controlling the laser light source, to enable a feedback loop to be implemented. For example, if detection of the holographic identifier indicated that the SLM was not behaving in an expected manner, and thus that there was a risk of the laser light being transmitted towards the observer in an unsafe manner, the controller could be configured to switch off the laser source or to otherwise block or prevent the laser light from illuminating the SLM further, or to reduce the intensity of the laser illumination, at least until any potential malfunction issues had been resolved.

In general terms: each hologram that is to be displayed by an SLM within a holographic projector system is calculated using an algorithm from a "target image". The "target image" comprises a conventional image such as, for example, a digital photograph. The present inventor has recognised that a fingerprint or identifier may be added to a target image—either, for example, in a peripheral area within the target image (for example, in one corner) and/or in an area immediately surrounding the target image. A hologram may then be calculated of the target image, including the added fingerprint, so that the fingerprint will be reconstructed with the target image, when the hologram is suitably displayed and irradiated. The fingerprint that is added to the target image may be of any suitable form. For example, it may comprise a simple geometric pattern such as an array of squares.

Figure 7A:
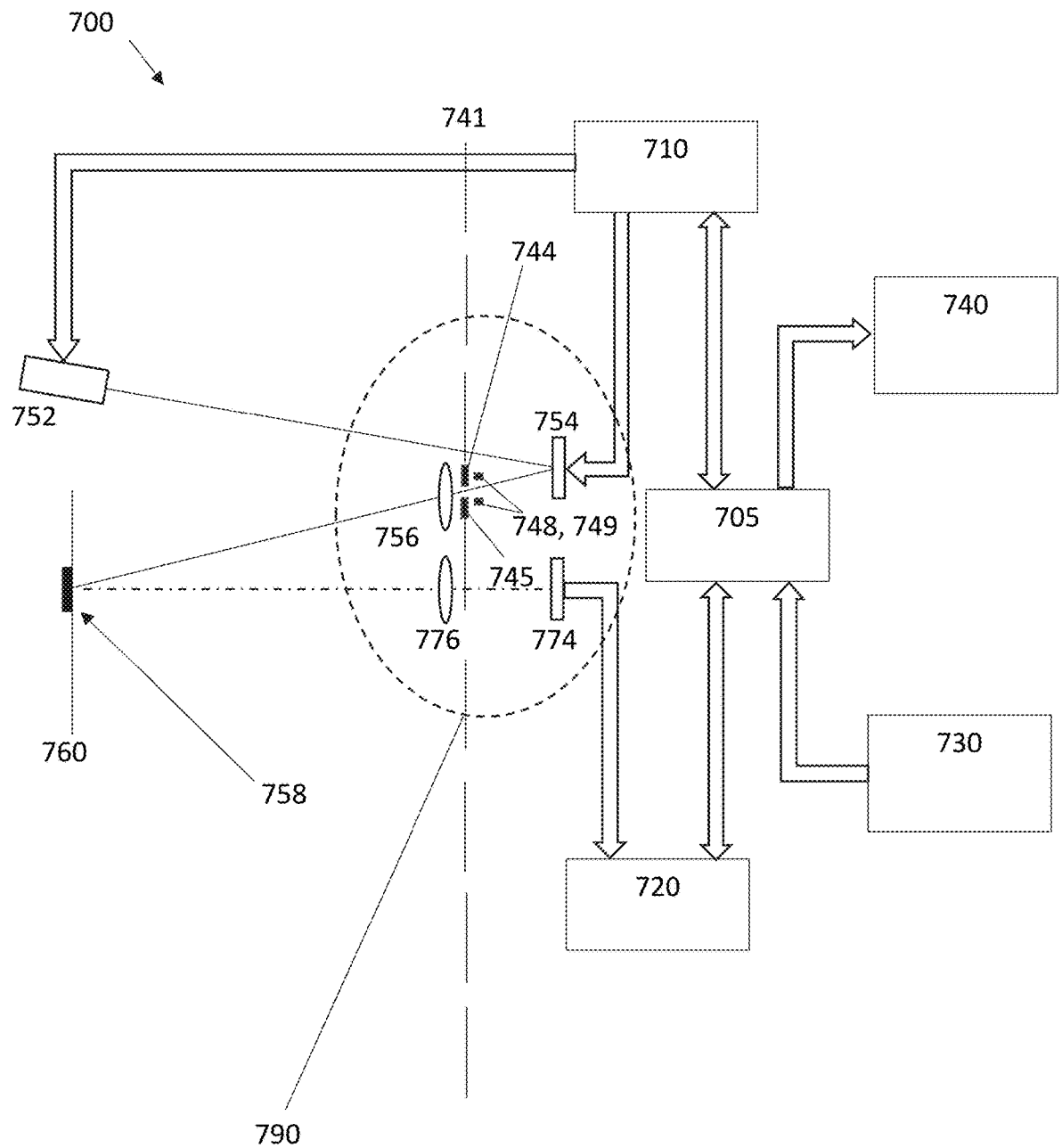
FIGS. 7A and 7B show an improved holographic Light Detection and Ranging (LIDAR) system, in accordance with embodiments.
Figure 7B:
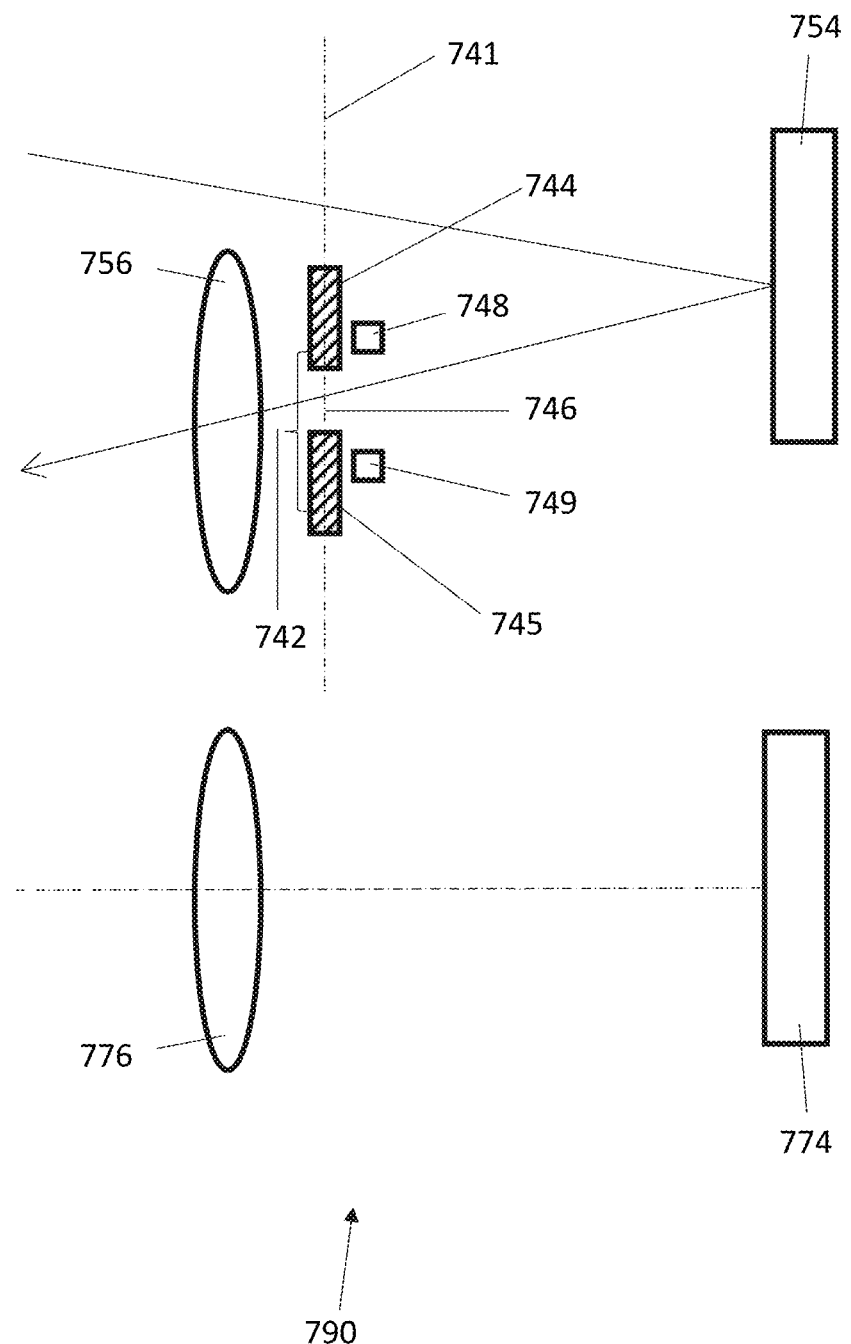

One type of holographic projector system that may embody the recognitions made by the present inventor is a holographic LIDAR system. FIGS. 7A and 7B comprises system diagrams for an example of a LIDAR system that embodies the recognitions made by the present inventor. The LIDAR system may be provided, for example, in a vehicle, as part of a navigation system, or in a portable device, or in a range of other applications.

The system comprises an SLM 754 and a light detector, which in this example comprises an array detector 774, which are provided coplanar with one another but spatially separated from one another, on a common plane. The SLM 754 is provided in conjunction with a projection lens 756 and the detector 774 is provided in conjunction with an imaging lens 776. There is a light source which in this example comprises a laser diode 752. The laser diode 752 is arranged to direct light towards the SLM 754, which is encoded with a hologram and which, upon illumination of the hologram with light from the laser diode 752, is arranged to reflect structured light towards an image plane 760, via the projection lens 756. The image plane 760 is located so as to coincide with a target scene, which is to be observed or interrogated, via the formation of a structured light pattern 758 thereon. The structured light will be at least partially reflected from the target scene, back towards the array detector 774, via the imaging lens 776.

The laser diode 752 is positioned and oriented so that the incoming light arrives at an acute angle to a central lateral axis (not shown) of the SLM 754. As a result, the structured light is also reflected away from the SLM 754, via the projection lens 756, at an acute angle, towards the image plane 760.

Although not explicitly shown, the SLM 754 may include a software lensing function that enables the image of the holographic reconstruction to be focussed at different respective distances, away from the plane of the projection lens 756. This can accommodate a target scene having some inherent depth, and thus enable observation of the scene at a plurality of different depths. A plurality of different lensing functions, each with a different respective focal length, may be provided, stored in a suitable repository, for selection if/when needed to achieve a desired range for the SLM 754. In other arrangements, the projection lens 754 is arranged such that fine-tuning of the focus using a software lens is not necessary.

Although not shown in FIGS. 7A and 7B, an FT (Fourier Transform) lens is provided in conjunction with the SLM 754. The FT lens may be a software lens or a hardware lens or a combination of the two. The FT lens is operable, with the SLM 754, to form a holographic reconstruction in free space in a holographic replay field, on a holographic replay plane 741, which is located between the SLM 754 and the projection lens 756. As described in relation to earlier figures, above, the projection lens 756 therefore projects an image of the holographic reconstruction towards the image plane 760, which coincides with a target scene that is to be observed using the LIDAR system 700.

A barrier 742 is located along an optical path of the reflected light, between the SLM 754 and the projection lens 756. The barrier 742 in this example comprises substantially first 744 and second 745 walls, positioned either side of a substantially central opening or aperture 746. However, other forms of barrier and/or opening are also contemplated.

The barrier 742 is arranged to be located on, or substantially on, the holographic replay plane 741 in the example arrangement shown in FIGS. 7A and 7B. Moreover, the aperture 746 within the barrier 742 is located, sized and shaped so as to coincide with the zeroth-order holographic replay field, such that at least part of the zeroth-order holographic reconstruction will be formed, in free space, within the aperture 746.

In other examples, the barrier may be located on a plane other than the holographic replay plane. For example, it may be located on a plane that is substantially parallel to the holographic replay plane but upstream or downstream thereof.

The particular size and shape of the aperture 746 may vary between different respective arrangements. In general terms, the aperture 746 may be tailored to the size of the holographic replay field, which itself depends on a number of factors such as pixel size of SLM 754 and wavelength of the light. The size and shape of the holographic replay field is not affected by the changes of hologram content between different respective holograms. However, a holographic replay field may be translated on its holographic replay plane, using a software grating. Therefore, some tolerance in the size of the aperture may be required, to accommodate any such movements. In other words, the aperture 746 may be sized and shaped so as to be slightly larger than the holographic replay field. The skilled reader will know, however, that the magnitude of any such movements are very small. In some arrangements, the aperture 746, and the barrier 742, may be moveable.

In this example, the aperture 746 is substantially quadrilateral as can be seen better from FIGS. 8A to 8D, which are discussed below—however other types of aperture are also contemplated, in respective other optical arrangements. The aperture 746 in the example of FIGS. 7A and 7B is located, sized and shaped so as to occupy most of the zeroth-order holographic replay field, and to surround a first part, or a first portion, of the holographic reconstruction, which is intended for onward travel towards the projection lens 756, to form an image of that first portion of the holographic reconstruction on the image plane 760, for observation of the target scene.

According to the methods described herein, there may be a second part, or second portion, of the holographic reconstruction that is not located within the aperture 746, and which therefore will be blocked from onward transmission by the walls 744, 745 of the barrier 742. That second portion of the holographic reconstruction may comprise a holographic identifier, which may be referred to as a holographic 'fingerprint'. The fingerprint could take any suitable form. For example, the fingerprint could be a distribution of light, which changes between different respective holograms and/or is moved around as a grating is applied to the hologram(s) that is/are displayed and illuminated, on the SLM 754. As mentioned above, the fingerprint may derive from a marker, or fingerprint, that was incorporated into a target image before hologram calculation, and holographically reconstructed with the remainder of the target image, upon irradiation of the hologram.

The first and second portions of a holographic reconstruction, mentioned above, may be referred to as first and second respective light pattern regions.

FIG. 7B shows a magnified view of an area 790, within FIG. 7A. As can be seen more clearly from FIG. 7B, one or more light detectors can be provided, to detect the holographic identifier, or 'fingerprint'. For example, in FIGS. 7A and 7B there are first 748 and second 749 photodiodes, provided either side of the aperture 746, respectively on the first 744 and second 745 walls of the barrier 742. In FIGS. 7A and 7B, the photodiodes 748, 749 are provided on the faces of the walls 744, 745 that are on the SLM side of the barrier 742. But it will be appreciated that other positions are contemplated for the light detectors, in certain arrangements. Moreover, in the example of FIGS. 7A and 7B there are only two photodiodes shown, but any suitable number and arrangement of light detectors may be provided.

The light detectors, such as the photodiodes 748, 749 of FIGS. 7A and 7B, may be configured to detect the presence of the holographic fingerprint, and to transmit detection signals to a suitable processor or controller. This is discussed further, below. Such a processor or controller may be communicatively coupled to another processor or controller, which controls operation of other aspects of the LIDAR system 700, including the operation of the laser diode 752. A feedback loop may be implemented wherein, if the detection signals from the photodiodes 748, 749 differ from one or more expected signals, which would have been detected, if the SLM 754 was correctly displaying the current hologram at a given time, the control aspects of the LIDAR system may be configured to take action, to prevent or reduce further incorrect operation of the SLM 754. For example, the control aspects of the LIDAR system 700 may be configured to pause or stop operation of the laser diode 752, or to reduce its intensity, or to block the path of the laser light either before it reaches the SLM 754, and/or between the SLM 754 and the observer, at least until the SLM 754 can be checked and, if necessary, fixed.

When a plurality of photodiodes are provided, the holographic fingerprint may be expected to trigger a detection signal from just one (or just a sub-group, within a larger group) of the photodiodes, at any given time. The photodiode(s) that is/are expected to detect a light signal, due to the fingerprint, may vary between different respective time frames or time instances. This may be, for example, due to the holographic replay field being translated on the holographic replay plane, due to the presence of a software grating. The light spots or other light distribution(s) that make up the fingerprint would, in such a situation, be translated along with the remainder of the light of the holographic reconstruction, when its holographic replay field is translated.

In general terms, having a moving fingerprint, which is detectable by different light detection elements at different respective times, may provide increased comfort that a holographic projector is functioning properly, because the safety check does not rely solely on one sensor. Instead, it enables the comparison of detected signals to one or more expected signals (or, to one or more expected signal patterns) for each of a plurality of sensors, over time, and therefore provides a higher degree of validation. For example, a holographic projector system could be arranged to validate (or invalidate) the irradiation of a hologram based on a number of time-varying signals from each of a plurality of light sensors, which are dedicated to detecting the fingerprint. Having redundancy between sensors, and optionally also between signal instances for which a comparison is made, increases the overall likelihood that a holographic projector system is configured to accurately determine whether or not its components, such as its SLM, are functioning properly. Moreover, for laser safety it may be necessary to shut off or reduce the laser power very quickly, for example, within two grating or hologram changes, in case of SLM failure, to ensure there is no eye hazard to an observer. Having multiple detectors, corresponding to multiple possible positions of one or more light spots within a holographic reconstruction, is likely to increase the probability of detecting a fault within a relatively small number of grating/hologram changes, and thus increase the speed at which such a failure of the SLM can be detected and, when possible, remedied.

In the example of FIGS. 7A and 7B, the control aspects of the LIDAR system 700 are represented as including a system controller 705, a hologram controller 710, and a scene detection controller 720. The system controller 705 is an overall (or 'central') controller for the LIDAR system 700 and may be configured to receive inputs from, and provide outputs to, both the hologram controller 710 and the scene detection controller 720. In FIGS. 7A and 7B, the system controller 705 is also configured to receive inputs from the photodiodes 748, 749. There may also be other inputs 730 provided to the system controller 705, and/or the system controller 705 may provide one or more other outputs 740.

The hologram controller 710 is configured to control the supply of holograms to the SLM 754, and to control operation of the laser diode 752. The scene detection controller 720 is configured to receive light detection signals from the array detector 774 and to transmit those received light detection signals, or to transmit determinations made in relation to those received light detection signals, to the system controller 705, in order for observations to be made about the target scene, which coincides with the image plane 760. LIDAR techniques for the observation of such a scene are known and are not the main focus of the present disclosure, so will not be discussed in any more detail herein.

Although control aspects such as the system controller 705, hologram controller 710, and scene detection controller 720 are shown in FIGS. 7A and 7B as being physically distinct from one another, this is a schematic/functional representation only. In practice, their functions may be carried out, in any suitable combination, by any suitable computer(s), or controller(s) or processor(s).

The system controller 705 is configured to control the selection of an appropriate hologram and/or an appropriate grating function and/or an appropriate software lens, for display on the SLM 754. The hologram controller 710 and/or the system controller 705 can also convey operational signals to the laser diode 752, for example to control the timing of light pulses towards the SLM 754.

The SLM 754 may be controlled to display different holograms, at different respective times. Each hologram, when irradiated, will give rise to a holographic reconstruction of a distinct structured light pattern, with discrete areas of light (of a particular brightness) and with dark areas therebetween. A plurality of different holograms may be individually displayed at random, or in sequence. In an embodiment, the structured light pattern projected onto the scene remains the same between two holograms but the "fingerprint" is changed between them. This provides timely evidence that the SLM is still operating correctly (due to the changing signals on the photodiode) even when the LiDAR system does not require a change in the structure light pattern.

According to an example, the SLM 754 may be controlled to display first and second holograms, one after the other, in which 'main' part of the hologram (that represents the target image) is unchanged between the first and second holograms, but the holographic fingerprint is different in each of the first and second holograms. In such an example, the structured light pattern that is projected onto a scene remains the same between two holograms, but the "fingerprint" is changed between them. Therefore, the expected light detection signals would be different for each of the first and second holograms. This may provide timely evidence that the SLM is (or is not) still operating correctly, even when the LiDAR system does not require a change in the structured light pattern on the scene.

The hologram controller 710 may be configured to either calculate an appropriate hologram or to retrieve an appropriate hologram from a memory, for display on the SLM 754 at a given time. It may comprise any suitable combination of hardware and software. It may include a memory and/or it may have access to a separate memory. It may also be comprised or be communicatively coupled with a data frame generator and a display engine, which may comprise for example a Field-Programmable Gate Array (FPGA). The display engine may be configured to combine the generated or retrieved hologram with any other suitable aspects, such as a software lens and/or a software grating, for display by the SLM 754.

The hologram controller 710 may control (or 'drive') the SLM 754 to display the appropriate hologram, with a software lens and/or a software grating, if selected. As a result; when the SLM is irradiated by the laser diode 752, the resultant holographic reconstruction will be formed, at the image plane 760, and should be aligned with an individual field of view (IFOV) of the array detector 774, for the purpose of observing the scene.

As mentioned above; the system of FIGS. 7A and 7B may operate based on a feedback loop, wherein information derived from one or more previous frames may be used to drive subsequent selections and/or other actions. For example, information derived from one or more of the photodiodes 748, 749 may be used to control subsequent control of the laser diode 752. In particular, the photodiodes 748, 749 may be located so as to detect the presence (or absence) of the holographic fingerprint that should be displayed, in the second portion (or, second light pattern region) of the holographic reconstruction that is formed at the holographic replay plane 741, due to illumination of a hologram on the SLM 754, at a given time.

The system controller 705 may be configured to receive one or more light detection signals from the photodiodes 748, 749, which indicate one or more characteristics of the holographic fingerprint, and to compare them to the corresponding one or more characteristics that would have been expected for the holographic fingerprint, if the correct hologram was being correctly illuminated, at a given time. A 'characteristic', in this sense, may comprise, for example, a binary indicator as to the presence or absence of the light of a holographic fingerprint, at one or more specific sensors. The system controller may therefore, for example, be configured to compare an expectation of which sensors were expected to detect light of the holographic fingerprint, at a given time, to a record or measurement of which sensors have, in practice, detected light of the holographic fingerprint, at that time. The system controller may also, or instead, be configured to compare an expected time pattern or sequence of different respective sensors (at different respective locations) detecting light of the holographic fingerprint over a period of time to a record or measurement of which pattern or sequence sensors have, in practice, detected light of the holographic fingerprint, over that time period.

In some cases, the characteristic of the holographic fingerprint may comprise a non-binary (or, 'greyscale') indicator, such as a magnitude or other measurement, derived from a light sensor signal. For example, if a fingerprint comprises more than one light spot, of different respective sizes and/or brightnesses, the system controller may be configured to determine, from received light sensor signals, whether a light spot of the expected size and/or brightness has been detected (by the sensor that would have been expected to detect it) at a given time.

The system controller 705 may be programmed, as detailed above, to 'know' (and possibly to be in control of) which hologram should be displayed at a given time—for example, during a particular 'frame' of operation of the LIDAR system 700. According to the present disclosure, the system controller 705 can also be programmed to 'know'

(and possibly to be in control of) which holographic fingerprint should be comprised within the second light pattern region of the zeroth-order holographic reconstruction of that hologram, when it is correctly and safely illuminated by the laser diode 752. Therefore the system controller 705—or, any other suitable processor or controller comprised within, or communicatively coupled to, the LIDAR system 700—may be configured to compare one or more signals from the photodiodes 748, 749 with one or more corresponding expected signals, based on detection of the holographic fingerprint, at a given time.

The photodiodes may be configured to detect, in relation to the holographic fingerprint, any combination of, for example: the presence or absence of a fingerprint (i.e. an indicator of whether any fingerprint has been detected); an indication of the fingerprint's location (for example, an indication of which photodiode(s) it has been detected by); an indication of its brightness, shape, light distribution pattern, or size. As mentioned above; several sensors may be configured to detect the fingerprint, and in some cases the identity of the sensor(s) that is/are expected to detect the fingerprint will be time-varying, as the fingerprint is translated around the holographic replay plane.

The fingerprint may have any suitable shape, or light distribution pattern—for example, it could comprise a simple pattern, such as two light spots, or it could be more complex. For example, the fingerprint could comprise a pattern or formation in which there is greyscale variation in light intensity, between different respective spots or other positions, within the fingerprint. Regardless of the complexity of the fingerprint, the system controller 705 may be configured to monitor how (and/or when) the fingerprint (or parts of the fingerprint) interact(s) with the light sensors. In the example of FIGS. 7A and 7B, the system controller 705 can be arranged to know which sensors of a plurality should be activated, and which should not be activated, with each time frame, based on the positions of the sensors and the shape/configuration of the fingerprint's light pattern, and (if applicable) its expected movements, around the holographic replay plane 741. Therefore, the system controller 705 can use the outputs of each of a plurality of sensors—such as the photodiodes 748, 749—to validate or invalidate the operation of the system, for a given time frame.

If a comparison determines that a detection signal for a fingerprint does not match an expectation for that fingerprint, at a given time, at least to within a predetermined tolerance level, the system controller 705 may be configured to take action, to avoid or at least reduce the risk of malfunction of the LIDAR system 700, for example to prevent the risk of the laser dazzling and/or causing eye damage to an observer.

The action that the system controller 705 may be configured to take, in the event that any detection signal related to a fingerprint does not match an expectation, may depend on the details of the signal for which there is a mismatch between an expectation and a detection, and possibly on the nature and/or the extent of the mismatch. The system controller 705 may be programmed (or otherwise configured) to follow different respective procedures, dependent on which signal(s) (and/or characteristic(s)) are found not to match their expectation, and/or dependent on how much they differ from their expected level/location/magnitude etc.

At least in some cases, if the system controller 705 determines that a detection signal relating to a holographic fingerprint does not meet an expectation, at least to within a predetermined level of tolerance, it may be configured to issue a signal to stop or at least to pause the operation of the laser diode 752, or to reduce its power, and/or to otherwise block the path of light between the laser diode 752 and the observer, via the SLM 754. This is to prevent the risk of the laser light being incorrectly transmitted by the SLM 754—for example, being transmitted as a concentrated spot of light—towards the observer, which could cause him or her to suffer eye damage and may also dazzle the observer, leaving him or her unable to see temporarily. It will be appreciated that the risk of the observer being dazzled may be very high if he or she is the driver of a vehicle, even if the laser light would not be concentrated or powerful enough to cause eye damage.

In some arrangements, the system may be configured so that the light of the holographic reconstruction (or, of an image of the holographic reconstruction), which is aligned with an individual field of view (IFOV) of the array detector 774 for the purpose of observing a scene, has an optical power that is within eye-safe limits for each IFOV. Therefore, if the SLM functions correctly, the optical power that is detected by the array detector 774 and that may be observed by an observer should not pose the risk of eye damage to the observer. However, in such an arrangement, whilst each individual IFOV may have an eye-safe amount of optical power, the total amount of optical power for all of the IFOV's (or, for several of the IFOV's combined) may exceed (possibly, greatly exceed) eye safe limits. Therefore, if the SLM failed and, for example, all the optical power was focused into a single central spot, the optical power of that spot would be potentially very dangerous to the eyes of an observer. It is therefore very important, in such an arrangement, to know that the SLM is working correctly to spread the light and, thus, the optical power, over the different individual fields of view (IFOV's), within a scene.

A comparison between one or more expected signals and one or more measured signals may be carried out at any suitable intervals. For example, it could be synchronised with the frame intervals of the SLM 754. In some arrangements, the comparison may be done periodically, independently of the SLM frame rate, or, for example, synchronised with the laser pulse rate, or at any other suitable frequency.

Figure 8A:
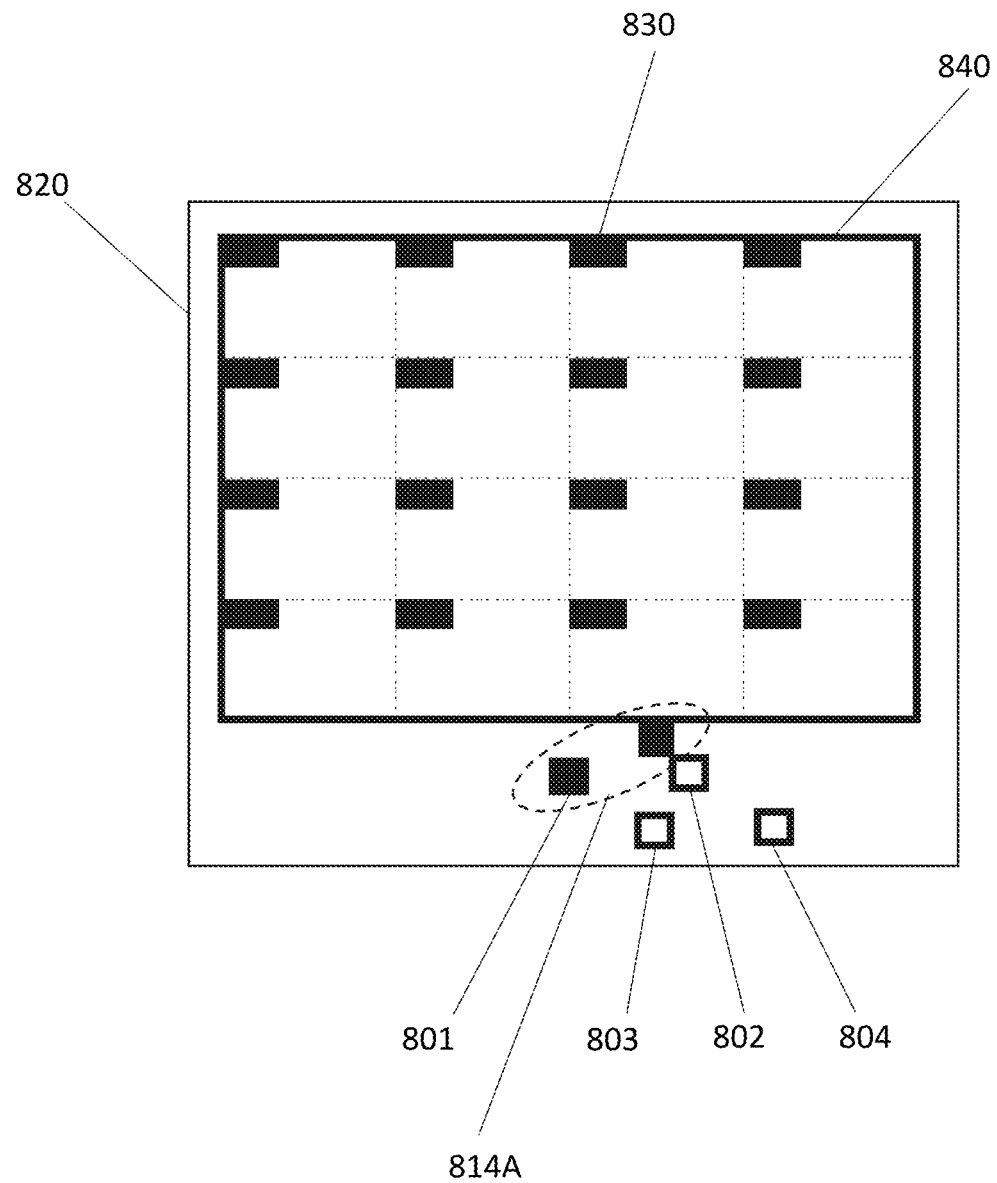
FIG. 8A shows a holographic reconstruction at a first grating position.

FIGS. 8A to 8D illustrate an example of a holographic reconstruction that includes a holographic fingerprint, and which may be formed by a holographic projection system, for example a LIDAR system such as the one shown in FIGS. 7A and 7B. It should be appreciated that this example is illustrative only and should not be regarded as limiting. In FIG. 8A, a zeroth-order holographic replay field 820 is shown as being a substantially quadrilateral area. It is comprised on, or within, a holographic replay plane, however the remainder of the holographic replay plane is not shown in FIG. 8A, for simplicity. The higher-order holographic replay fields are also not shown in FIG. 8A, however the skilled reader will appreciate that the irradiation of a pixelated display device such as an SLM, for example an LCOS SLM, will lead to the creation of multiple orders of replay fields, with the zeroth-order being at the centre and being the brightest of the replay fields. For simplicity, the zeroth-order holographic replay field 820 will be referred to as 'the holographic replay field 820', in the present description.

An aperture 840 is defined within the holographic replay field 820. The aperture 840 may be formed as an opening or a window in a barrier, such as the barrier 742 shown in FIGS. 7A and 7B, or in another suitable formation. However, the walls of such a barrier are not shown in FIG. 8A, to facilitate sight of the features that would otherwise be blocked by those walls. The aperture 840 is shaped, sized and located in this example so as to frame a first portion—or, a first light pattern region—of a holographic replay field, within which a holographic reconstruction is formed. The holographic reconstruction is created by the irradiation of a hologram on an SLM, using an optical arrangement such as that shown in FIGS. 7A and 7B. The first light pattern region comprises a plurality of blocks of light 830, arranged in a grid formation, wherein each block of light 830 occupies its own respective area (or co-ordinate) within the grid formation. In this example, there are 16 blocks of light 830, arranged in a 4×4 grid formation. The blocks of light 830, in their grid formation, form a structured light pattern. The structured light pattern may be translated, or scanned, around the holographic replay plane, which will be discussed in more detail, below.

As per the example detailed above in relation to FIGS. 7A and 7B, the aperture 840 in this example (and the barrier or other formation in which the aperture 840 is formed) is configured to allow transmission of the structured light pattern that is comprised within the first light pattern region, i.e. that is formed within the perimeter of the aperture 840. Therefore the structured light pattern comprising the grid of 16 blocks may be transmitted, for example towards a projection lens, in order for an image of that structured light pattern to be formed on an image plane, within a scene that is to be observed or interrogated.

There is also a second portion—or, a second light pattern region—within the holographic reconstruction in FIG. 8A. The second light pattern region comprises the area, within the holographic replay field 820, which lies outside of the first light pattern region and thus lies outside the perimeter of the aperture 840. Therefore, in practice, when the aperture 840 is formed within a barrier or other formation, the walls of that barrier (which surround the aperture) would prevent any light within the second light pattern region from being transmitted onwards, for example towards a projection lens, image plane, or scene or object that is to be observed. Any light within the second light pattern region would therefore not contribute to the structured light pattern that is incident upon a target scene or object.

The above notwithstanding; the present inventors have recognised that providing a light pattern within the second light pattern region—for example, providing a holographic identifier or fingerprint—can be highly useful. This is because such a holographic fingerprint can be detected, and thus the holographic relay field can be monitored, just outside of the aperture or area in which the first light pattern region, which comprises the portion of the structured light pattern that is to be transmitted on to a target scene or object, is formed. However, the holographic identifier can itself be prevented from transmission towards a target scene or object of interest, at least in some arrangements.

The holographic identifier, according to this method, can comprise a definitive fingerprint, which may be time varying, and the characteristics of which can be used to make determinations about the manner in which a hologram has been illuminated, within an optical system such as a LIDAR system, and in particular to detect potential faults therein.

Suitable detectors, such as light detectors, can be located within a secondary light pattern region of a holographic replay field, to detect and/or to monitor a holographic fingerprint. In FIG. 8a, four photodiodes 801, 802, 803, 804 are provided for this purpose. In this example, the positioning of the photodiodes 801, 802, 803, 804 has been selected so as to coincide with multiple different predetermined positions of a holographic fingerprint. The photodiodes 801, 802, 803, 804 are spatially separated from one another, in two directions (shown as the vertical (y) and horizontal (x) directions, in FIG. 8a). The photodiodes 801, 802, 803, 804 are located just outside the perimeter of the aperture 840. They are therefore configured to detect the presence of an identifier or fingerprint in the secondary light pattern region—not to detect any light within the first light pattern region.

In some arrangements, the photodiodes 801, 802, 803, 804 may be configured to detect a magnitude, or a size, or a strength of light, within the holographic fingerprint. In other arrangements, the photodiodes 801, 802, 803, 804 are configured for binary operation. In such an arrangement, the output of each photodiode 801, 802, 803, 804 would either be a 0 (no light) or a 1 (light). A combined or concatenated output may be provided, comprising a combination of the individual binary readings for the four photodiodes 801, 802, 803, 804. For example, if for a particular frame, the first and second 801, 802 photodiodes are expected to detect light of the fingerprint and the third and fourth 803, 804 photodiodes are not expected to detect light of the fingerprint, the expected concatenated output would be '1100'. In practice, if the concatenated output from the four photodiodes 801, 802, 803, 804, for that frame, was anything other than '1100', this may be regarded as an indicator of a 'fail' within the system, in relation to which steps may have to be taken, as previously described. The output provided by the fingerprint sensors is continually changing in response to the light pattern on the replay plane.

The holographic fingerprint in this example comprises two relatively small blocks of light, offset from one another in two directions (shown as the vertical (y) and horizontal (x) directions, in FIG. 8a). For simplicity, these blocks will be referred to as an 'upper' block and a 'lower' block herein. However, it should be appreciated that these relative positional terms are used for illustrative purposes only, in relation to the example shown in FIGS. 8A to 8D, and should not be regarded as limiting. Similarly, any reference to 'left', 'right' or any other relative positional terms herein is to aid understanding of the illustrative example shown in FIGS. 8A to 8D, and should not be regarded as limiting.

The holographic reconstruction—which includes the grid of blocks of light 830, which occupy the first light pattern region, and the two blocks of light that make up the holographic fingerprint in the second light pattern region—is shown in a first position in FIG. 8A. As the skilled reader will know, a software grating can be combined with a hologram on an SLM, wherein a function of the software grating is to determine, or to move or shift, the position of the holographic replay field (indeed, of the entire array of replay fields, including higher orders, not shown in FIGS. 8A to 8D) on the holographic replay plane. For convenience, this may be referred to as 'scanning' the holographic replay plane but the person skilled in the art will appreciate the fundamental differences between the holographic, structured light system disclosed herein and LIDAR systems that "scan" using e.g. a rotating prism. The first position of the holographic replay field, and therefore of the holographic reconstruction, shown in FIG. 8A can therefore correspond to a first grating being applied to the hologram or, for example, to no grating being applied. In this example, there are 16 different positions of the holographic reconstruction, each corresponding to a different respective grating function, i.e. 4 different x-gratings and 4 different y-gratings, resulting in 16 different combinations.

When the grid of blocks of light 830, which occupy the first light pattern region, is in the first position (of sixteen), each block of light 830 occupies the upper left-hand corner of its respective square, or co-ordinate, within the grid. When the upper and lower blocks of light, which make up the holographic fingerprint in the second light pattern region, are in the first position (marked as position 814A in FIG. 8A), the lower block coincides with a first photodiode 801. Therefore, the fingerprint (or at least the lower block, within the fingerprint) is detectable, when the holographic reconstruction is in its first position. The upper block does not coincide with any of the photodiodes, in this position. An expected light signal from the photodiodes 801, 802, 803, 804 for this position would therefore be, in binary form, '1000'.

When the holographic replay field (and holographic reconstructions) shown in FIG. 8A is comprised within a LIDAR system, the holographic reconstruction (or an image of it) is projected onto a target object or scene, and a light detector is arranged to detect light reflected from the target or scene. In embodiments, each portion of the target or scene that is illuminated by the light within each respective square, or co-ordinate, within the grid of the holographic replay field in FIG. 8A, is detected by a respective sensor, within a plurality of sensors arranged in a regular array in a LIDAR detector. When each light spot 830 within the grid is scanned (using a software grating) over its respective square, or co-ordinate, only one sensor per square, or co-ordinate, within the LIDAR detector will receive light at any one time, and the other sensors of each square or detector will be dark, thus generating no detection signal.

Figure 8B:
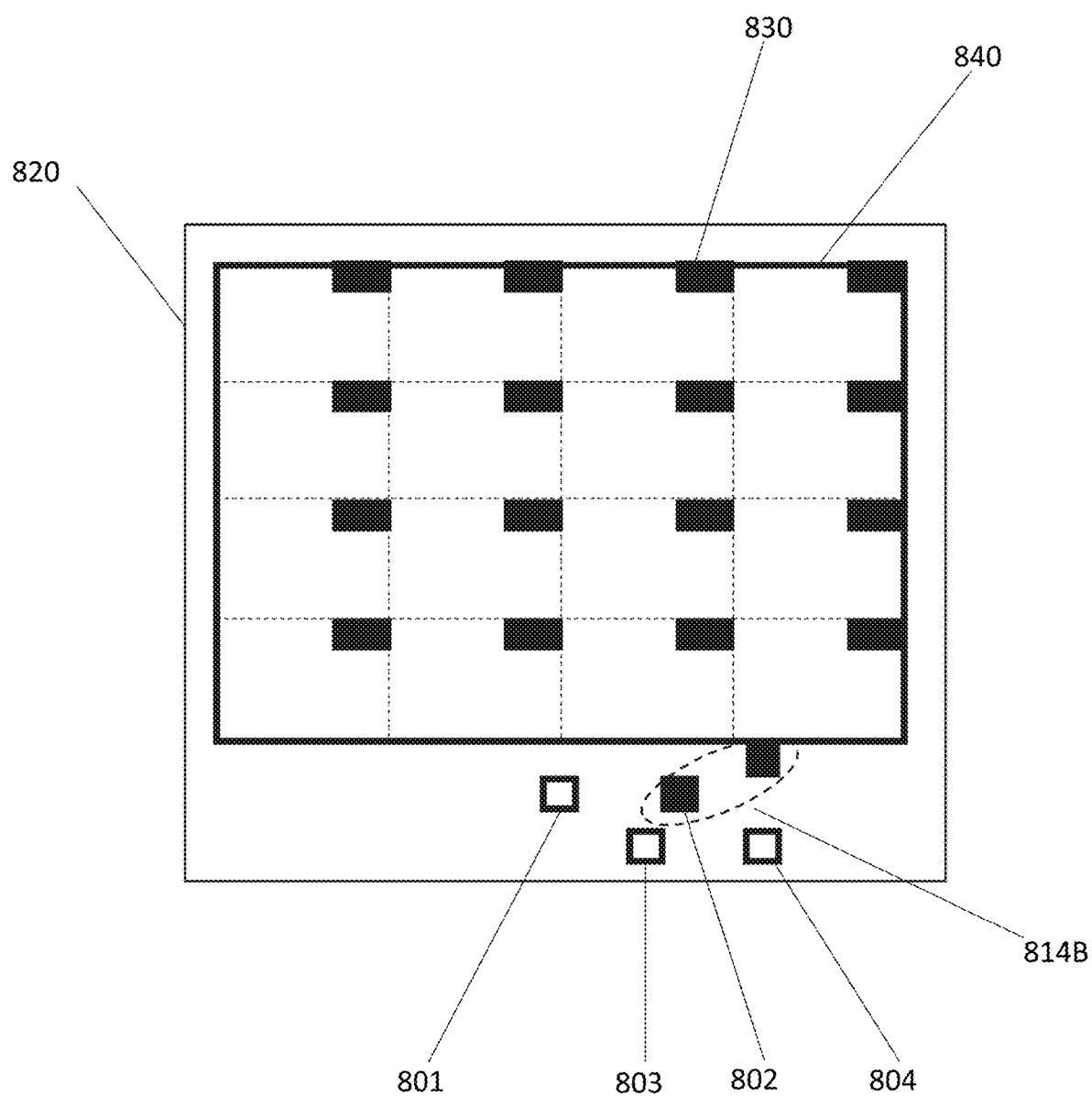
FIG. 8B shows the holographic reconstruction of FIG. 8A at fourth grating position.
Figure 8C:
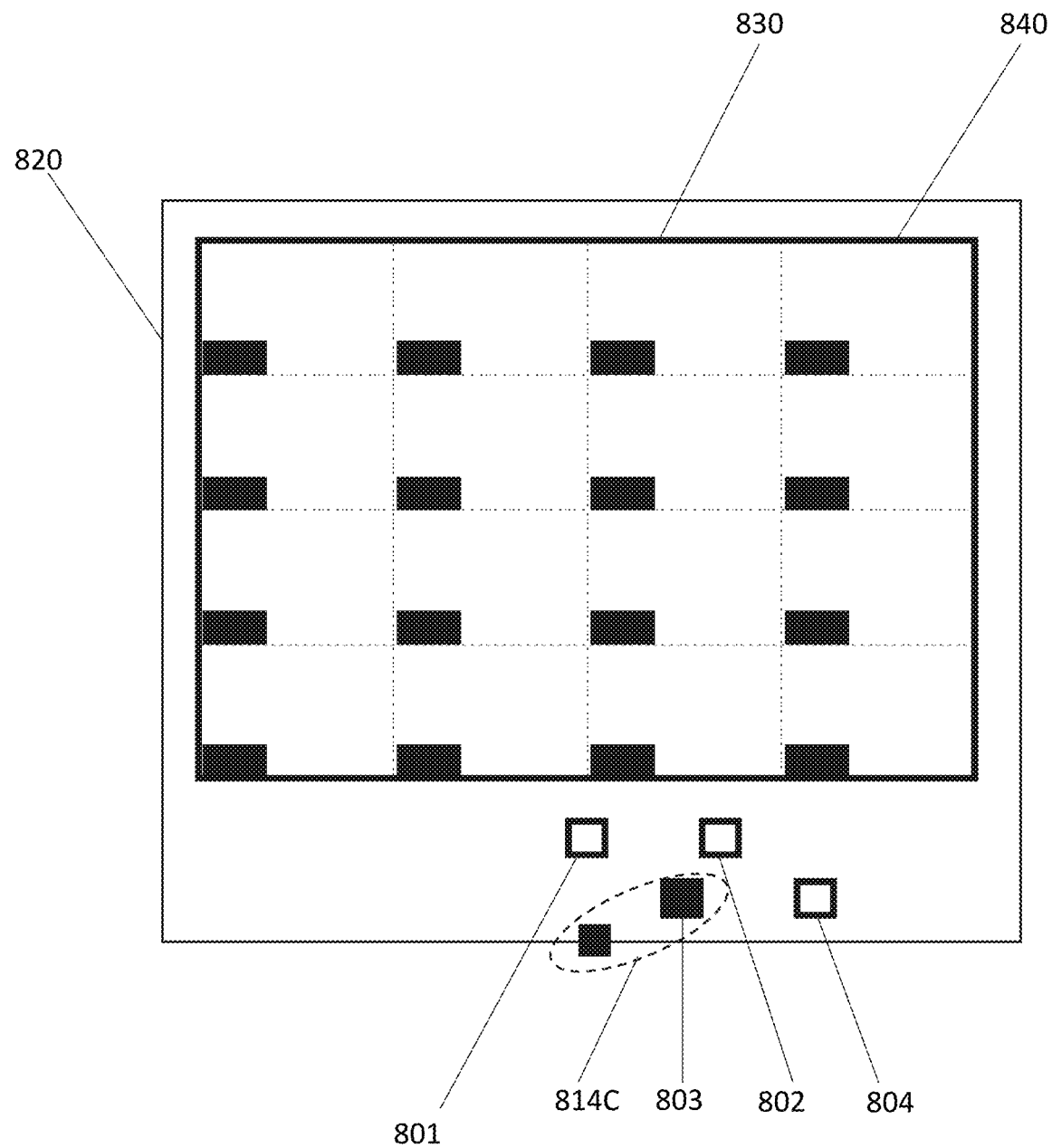
FIG. 8C shows the holographic reconstruction of FIG. 8A at thirteenth grating position.
Figure 8D:
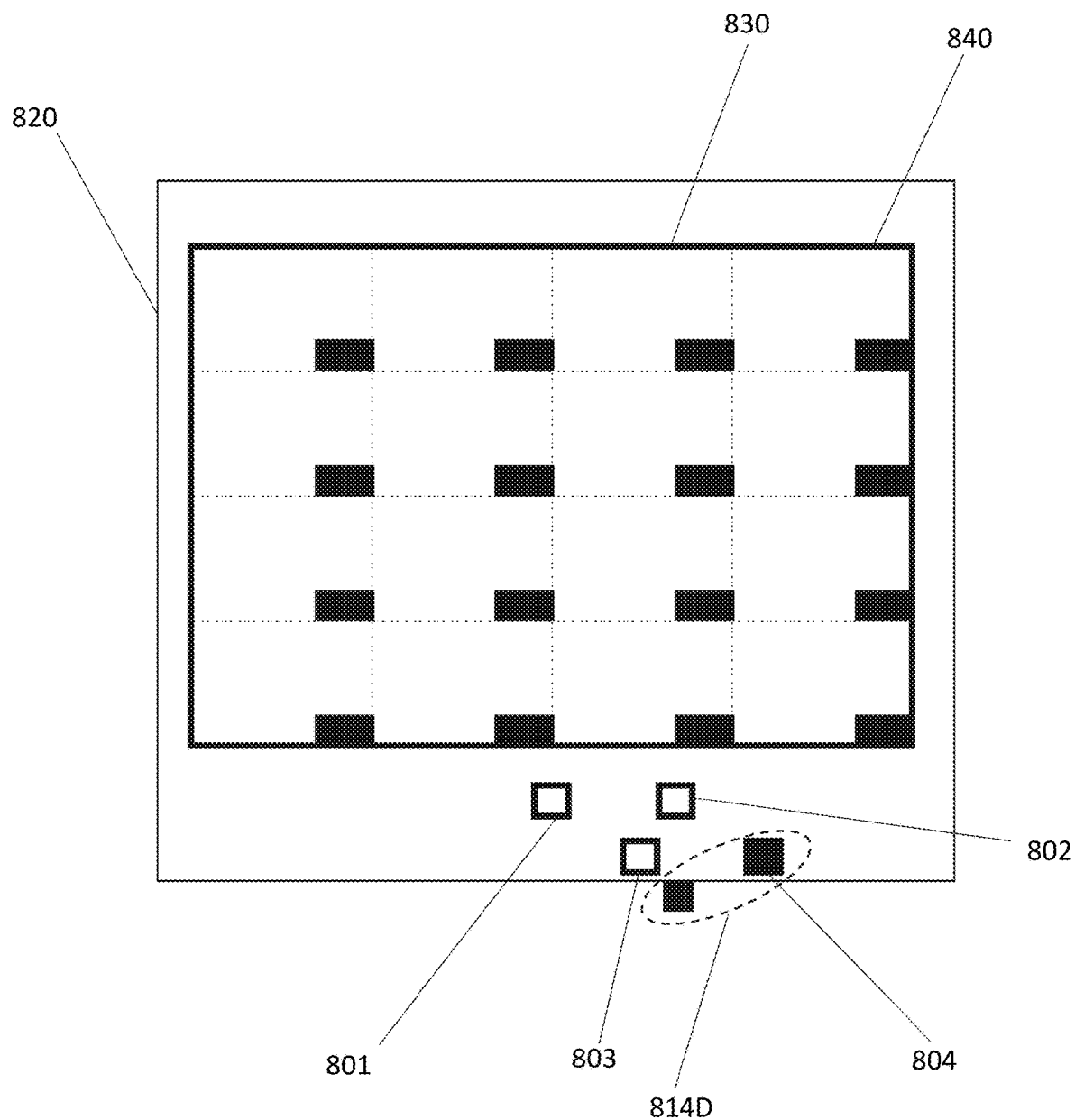
FIG. 8D shows the holographic reconstruction of FIG. 8A at sixteenth grating position.

FIGS. 8B to 8D show the holographic reconstruction of FIG. 8A in three further possible positions, corresponding to three further respective grating functions.

In FIG. 8B, which corresponds to a fourth (of sixteen) grating function, each block of light 830 in the first light pattern region occupies the upper right-hand corner of its respective square, or co-ordinate, within the grid. In the second light pattern region in that fourth position (marked as position 814B in FIG. 8B), the lower block of the holographic fingerprint coincides with a second, different photodiode 802. Therefore, the fingerprint (or at least the lower block, within the fingerprint) is detectable, when the holographic reconstruction is in its fourth position. The upper block does not coincide with any of the photodiodes, in this position. An expected light signal from the photodiodes 801, 802, 803, 804 for this position would therefore be, in binary form, '0100'.

In FIG. 8C, which corresponds to a thirteenth (of sixteen) grating function, each block of light 830 in the first light pattern region occupies the lower left-hand corner of its respective square, or co-ordinate, within the grid. In the second light pattern region in that thirteenth position (marked as position 814C in FIG. 8C), the upper block of the holographic fingerprint coincides with a third photodiode 803. Therefore, the fingerprint (or at least the upper block, within the fingerprint) is detectable, when the holographic reconstruction is in its thirteenth position. The lower block does not coincide with any of the photodiodes, in this position. An expected light signal from the photodiodes 801, 802, 803, 804 for this position would therefore be, in binary form, '0010'.

In FIG. 8D, which corresponds to a sixteenth (of sixteen) grating function, each block of light 830 in the first light pattern region occupies the lower right-hand corner of its respective square, or co-ordinate, within the grid. In the second light pattern region in that sixteenth position (marked as position 814D in FIG. 8D), the upper block coincides with a fourth photodiode 804. Therefore, the fingerprint (or at least the upper block, within the fingerprint) is detectable, when the holographic reconstruction is in its sixteenth position. The lower block does not coincide with any of the photodiodes, in this position. An expected light signal from the photodiodes 801, 802, 803, 804 for this position would therefore be, in binary form, '0001'.

An SLM may be configured, or controlled, to apply grating functions to a hologram on a cyclical basis, to repeatedly move the corresponding holographic reconstruction through its sixteen possible positions. An SLM may be configured, or controlled, to dynamically display a plurality of different holograms and, for at least some of those holograms, to apply one or more grating functions in order to change the position of the corresponding holographic reconstruction(s) on a holographic replay plane, on a dynamic basis.

The controller of a holographic system, such as the system controller 705 of the LIDAR system 700 of FIGS. 7A and 7B, or any other suitable controller, may be configured to 'know' which hologram and, when applicable, which grating and/or which software lens should be displayed and illuminated on an SLM, at a particular time. Such a controller may be configured to 'know' what fingerprint to expect, and what the signals detecting light of that fingerprint should be. For example, the controller may be programmed to know what position some or all of a holographic fingerprint should be in, at a given time, in absolute terms and/or relative to the positions of the photodiodes 801, 802, 803, 804. In the example of FIGS. 8A to 8D, this means that the system controller should know which photodiode, if any, should be illuminated by one or other of the blocks of the holographic fingerprint, at a particular time—for example, during a particular frame of operation of the SLM. The system controller 705 may therefore be configured to validate the received detection signals from the photodiodes 801, 802, 803, 804, if they match one or more expected detection signals, or an expected time sequence of time signals.

Figure 8E:
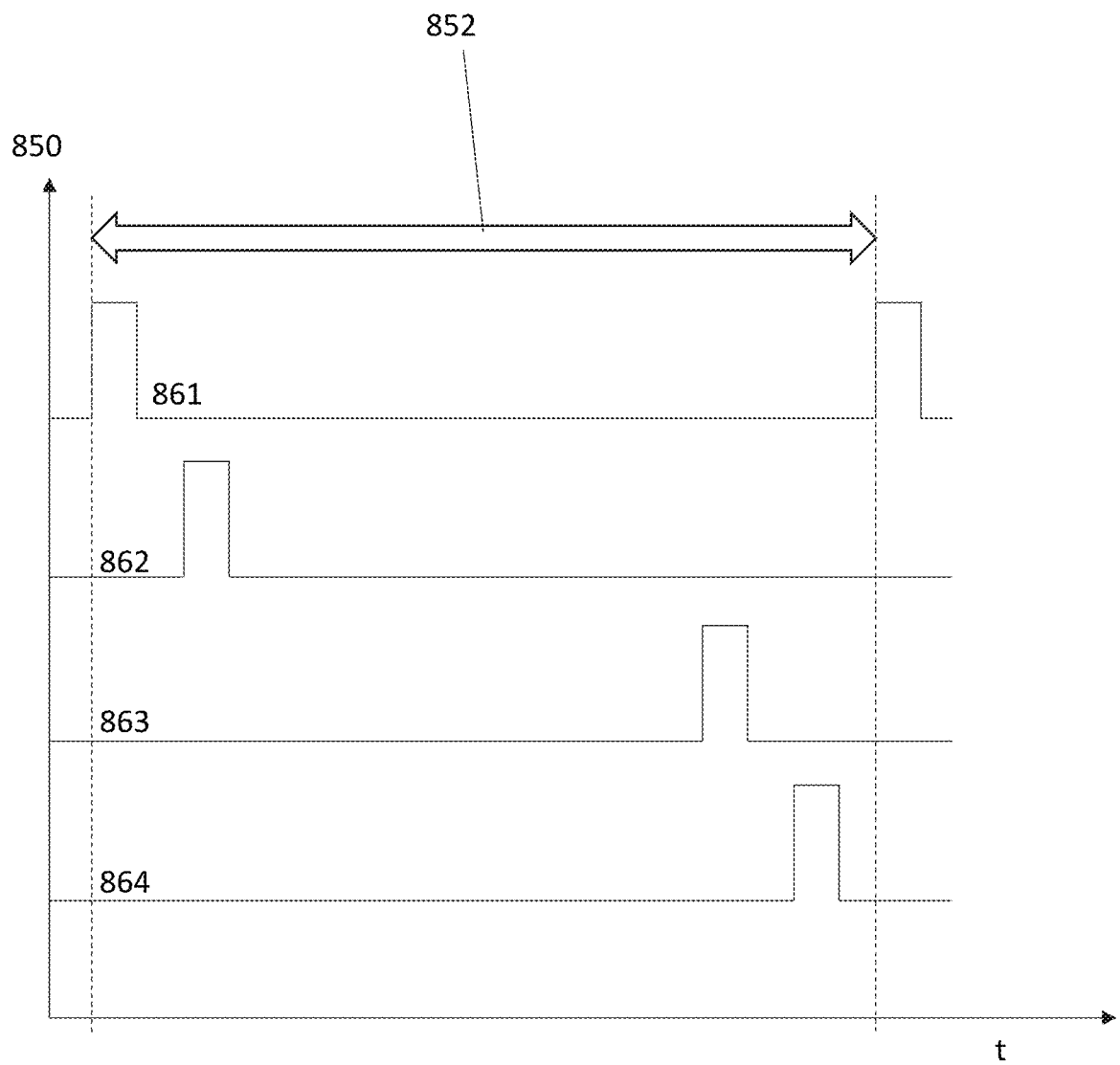
FIG. 8E shows expected signals from four respective light detectors, configured to detect the holographic reconstruction of FIG. 8A at a plurality of grating positions.

The skilled reader will appreciate that there will be times (for example, corresponding to particular grating functions and therefore to particular positions of a holographic reconstruction on the replay plane) at which the holographic fingerprint may be expected not to coincide with any of the photodiodes 801, 802, 803, 804, in the example of FIGS. 8A to 8D. At such times, an expected binary output from the four photodiodes 801, 802, 803, 804 would be '0000'. This is illustrated in FIG. 8E herein, which shows signal traces 861, 862, 863, 864 which correspond respectively to the expected light detection signals from each of the first to fourth photodiodes 801, 802, 803, 804, over time. The signal traces 861, 862, 863, 864 are shown over one time period 852, during which the holographic reconstruction cycles through its sixteen different positions. In this example, the system controller may be configured to compare a received (i.e. measured, in practice) signal trace, during such a period 852, from one or more of the photodiodes 801, 802, 803, 804 to the expected signal trace(s) shown in FIG. 8E. If there is a mismatch in the timing and/or in the strength of the signal received, form any of the photodiodes 801, 802, 803, 804, during that time period 852, the controller may take that as an indication that an incorrect hologram has been illuminated and/or that a hologram has been illuminated incorrectly, for example due to a fault with the SLM or SLM-driver which means that the right hologram is not displayed (or that no hologram is displayed at all). This may therefore serve as a trigger for the controller (or for a user) investigating potential problems further. It may be taken as a trigger for the laser light source, which is illuminating the SLM, to pause or stop its operation, or to halt emission of light, between the laser light source and an observer, in another way such as via activating a physical barrier or shutter, to eliminate any further possibility of malfunction that could risk user eye damage and/or dazzling an observer.

It will be appreciated that the scanning order of the gratings does not need to follow the "left-to-right, top-to-bottom" sequence that is described above. For example, an order of the gratings could be configured so that there is minimal deadtime in the fingerprint—i.e. minimal time when the expected output of the photodiodes would be '0000'. In such an example, there would therefore always be some evidence of whether the fingerprint is showing a correct signal, because there would always be at least one detected photodiode signal, to compare to a detected signal.

Figure 9:
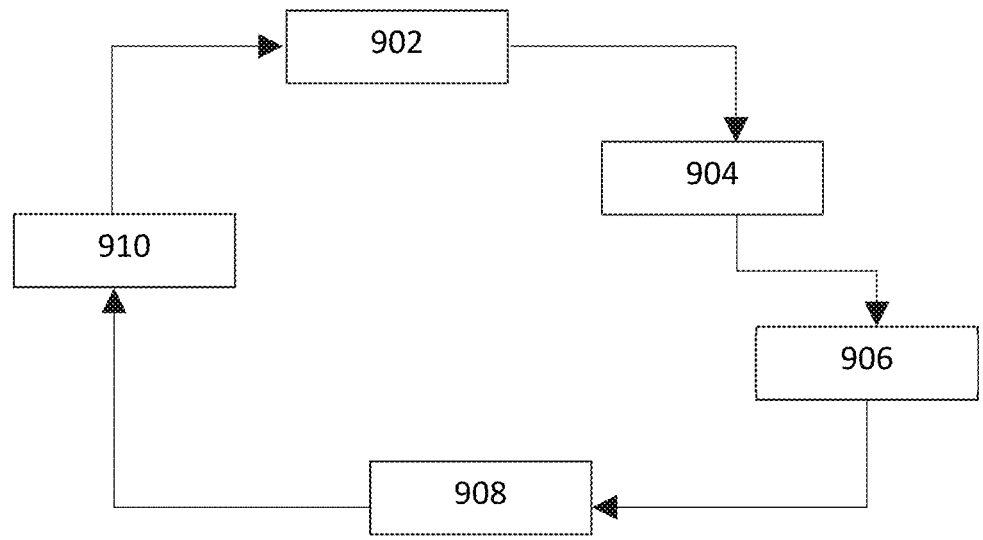
FIG. 9 shows a schematic representation of a safeguarding method for an improved LIDAR system, in accordance with embodiments.

By way of summary, FIG. 9 illustrates a safeguarding method, which can be adopted by a LIDAR system controller or other suitable controller or processor, in accordance with the recognitions made by the present inventors herein. The method 900 comprises a feedback loop, wherein the steps of the method 900 can occur on a cyclical basis. Those steps are as follows.

At step 902, a light source, such as the laser diode 752 of the LIDAR system 700 of FIGS. 7A and 7B, emits light, for example laser light. The light is directed towards a display device, such as a pixelated display device, for example an SLM, for example an LCOS SLM. The laser light source may emit light under the control of a suitable controller.

At step 904, the display device is illuminated. The display device, which might be an LCOS SLM, is configured to display a hologram, which may be combined with a grating and/or a software lens. An FT lens may also be provided, in conjunction with the LCOS SLM, in order for its illumination to give rise to the formation of a holographic reconstruction.

At step 906, a detector, for example a light detector such as a photodiode (or photodiodes), detects a light signal within the holographic reconstruction that is formed by illumination of the display device. Although the examples discussed thus far in the present application have the photodiode situated at the zero order holographic replay field, on which a holographic reconstruction is formed, it is possible—as will be described in more detail below, in relation to subsequent examples—for the photodiode to be situated at an image plane, on which an image of a holographic reconstruction is formed and/or to be situated within a higher-order holographic replay field. It is also possible for the photodiode(s) to be situated at an interim position, for example between the SLM and the holographic replay plane or between the holographic replay field and a downstream image plane. There may be more than one detector and it/they may be located, sized and/or shaped in order to detect a particular feature of a holographic reconstruction, such as a particular holographic identifier or fingerprint.

At step 908, one or more signals from the detector(s) is received and processed by a controller—which comprises, or which is comprised within, or which is communicatively coupled to, the controller that controls emission of light from the laser light source at step 902. The controller at step 908 processes the signal(s) from the detector(s) to determine whether they are as expected. If they are, the controller can verify holographic identifier or fingerprint.

If the holographic identifier or fingerprint has been verified by the controller, at step 910 the controller (or another controller, communicatively coupled thereto) proceeds to issue an instruction to the laser to emit light (or to continue emitting light), at which point the method 900 returns to step 902 and repeats itself. If, however, the holographic identifier or fingerprint has not been verified at step 908, the safeguarding method will pause, or stop, the light emission, or reduce the optical power of the light emission, to enable investigations to occur, and for any appropriate fixes to be made, in order to ensure safe operation of the system.

According to another example, which also embodies the safeguarding method 900 as summarised in FIG. 9, one or more light detectors may be provided in a higher order holographic replay field, in order to assess whether a holographic system, such as a LIDAR system, is functioning correctly.

Figure 10A:
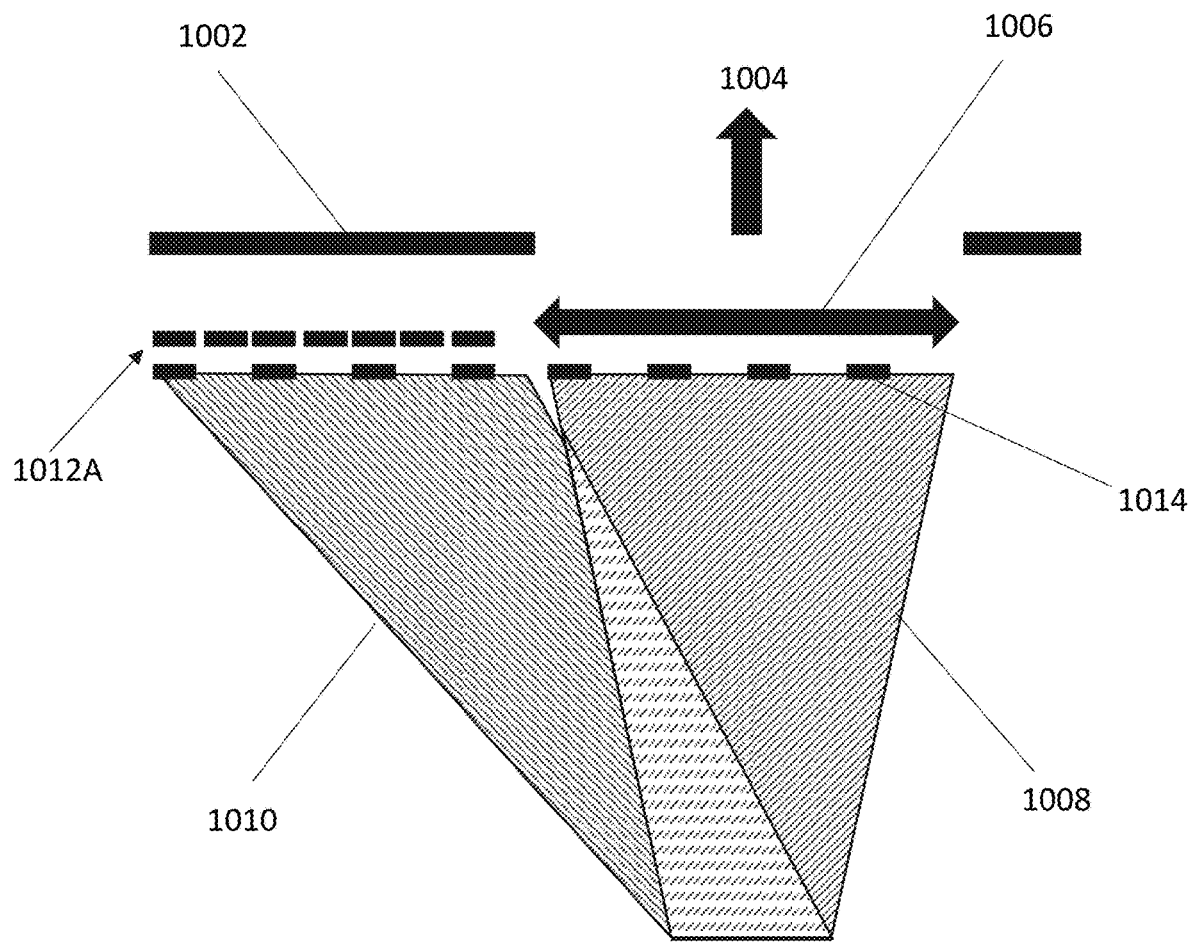
FIG. 10A shows a first arrangement for an improved LIDAR system, in accordance with further embodiments.

FIG. 10A shows cross-sections of the light cones 1008, 1010 that form, respectively, the zeroth-order holographic replay field and one instance of the first-order (i.e. the negative first-order in the x-direction, or (0, −1) order) holographic replay field, which occur when an SLM displaying a hologram is illuminated with suitable laser light. For simplicity, the light source and SLM are not themselves shown in FIG. 10A.

A holographic replay plane 1014 is depicted by a dashed line, across the upper edges of the cross-sections of the light cones 1008, 1010, in FIG. 10A. The holographic replay plane 1014 is the plane at which the (intermediate) holographic replay fields are located, and thus the plane at which a plurality of holographic reconstructions (zeroth-order and higher orders) of an illuminated hologram will be formed.

The breadth (i.e. the lateral extent, along the x axis) of the zeroth-order holographic replay field is depicted by a double-sided arrow 1006, in FIG. 10A. A formation 1002, such as a barrier, is provided just downstream of the holographic replay plane 1014, in the direction of travel of the light, which is indicated by an arrow 1004. The light is travelling from the illuminated SLM (not shown), towards a scene (also not shown) that is to be observed, for example as part of a LIDAR system. The barrier 1002 includes an opening, or aperture, which is sized and shaped to match the size and shape of some or all of the zeroth-order holographic replay field 1006. In some arrangements, only part of the zeroth-order holographic replay field 1006 may be desired because respectively other parts are known to contain noise (not image content). For example, such noise may result from a hologram calculation algorithm. Any such noise may therefore be deliberately cropped out, by the aperture. Thus, the aperture is configured to transmit all light within the zeroth-order holographic reconstruction (or, all of the desired light within the zeroth-order holographic reconstruction), onwards towards the scene that is to be observed.

The above being the case; it may be disadvantageous for a light detector to be positioned to detect light in a portion of the zeroth-order holographic reconstruction, because it would obstruct the path of the zeroth-order holographic reconstruction, towards the scene. Therefore, in this example, one or more light detectors 1012A is provided to monitor a higher order holographic replay field—in this case, the negative first-order in the x-direction, or (0, −1) order, replay field.

The methodology in this example is highly similar to that which has been described above in relation to monitoring a portion of a zeroth-order holographic reconstruction. In short; one or more suitably placed light detectors 1012A may be used to monitor the negative first-order holographic replay field signals—more specifically, to monitor for light detection signals relating to a secondary light pattern region, within the (0, −1) replay field, which comprises a holographic fingerprint. For example, the timings and/or the intensities of such signals may be monitored, as well as the timings and/or the order at/in which particular individual (or sub-groups of) detectors 1012A detect light of the holographic fingerprint. Such monitoring may be performed in order to provide evidence for assessing whether the system—and, in particular, the SLM—is functioning correctly. The light detectors 1012A, or a controller coupled thereto, can monitor for a change in a signal from one or more of the detectors 1012A, for example when a grating is applied to move the holographic replay fields around the holographic replay plane, and to detect any anomalies between an expected behaviour and a detected behaviour of the system.

In the example of FIG. 10A, light detectors 1012A are provided across the full breadth of the first-order (0, −1) holographic replay field. Therefore, the first-order holographic reconstruction can be detected in its entirety, by the detectors 1012A.

Figure 10B:
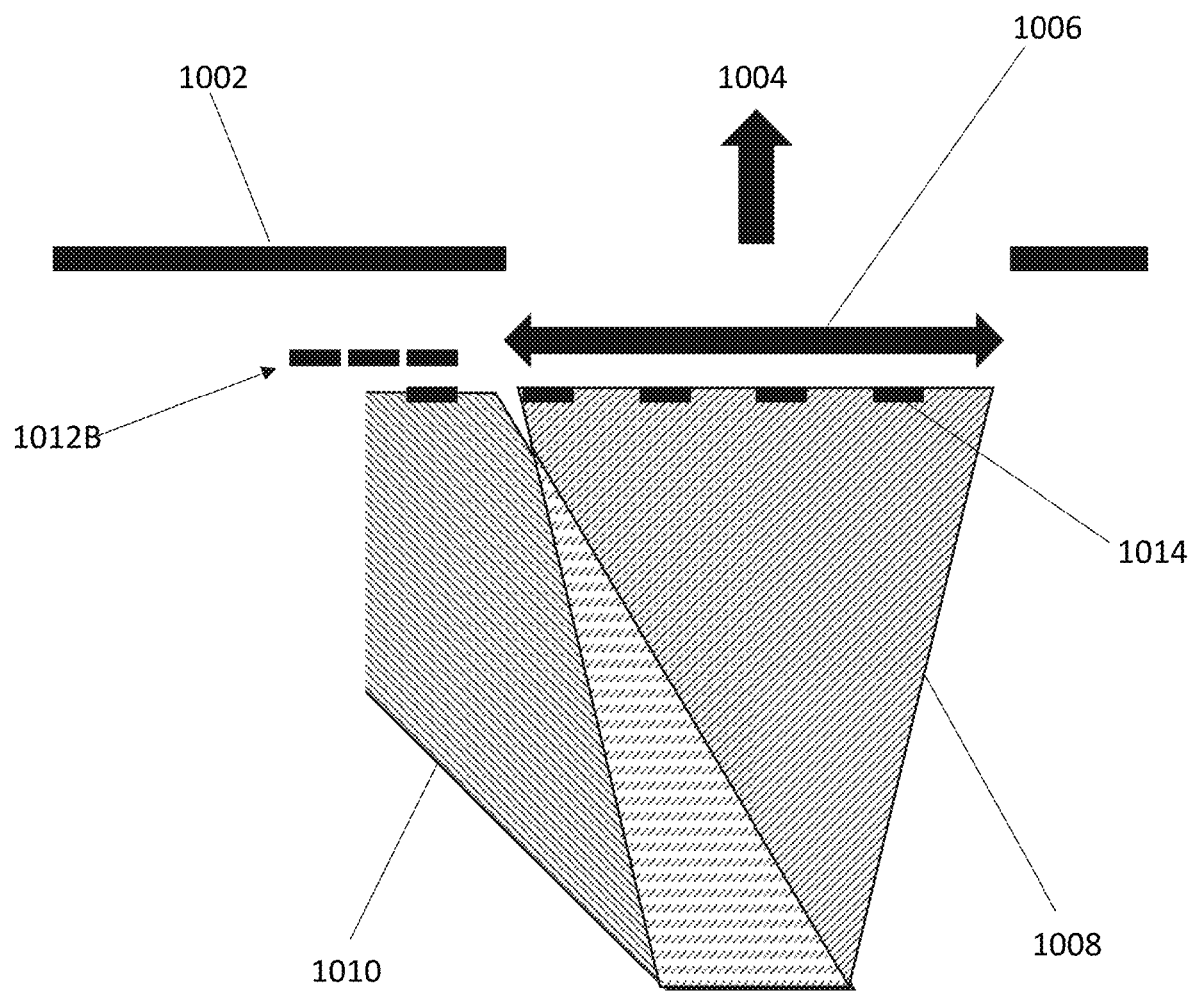
FIG. 10B shows a second arrangement for an improved LIDAR system, in accordance with further embodiments.

FIG. 10B shows an alternative arrangement, which is highly similar to the arrangement of FIG. 10A, except that light detectors 1012B are provided across only part of the first-order (0, −1) holographic replay field. Therefore, only part of the first-order holographic reconstruction can be detected, by the detectors 1012B. However, this may be sufficient, in many cases, to provide reliable monitoring of the functioning of the system.

Figure 10C:
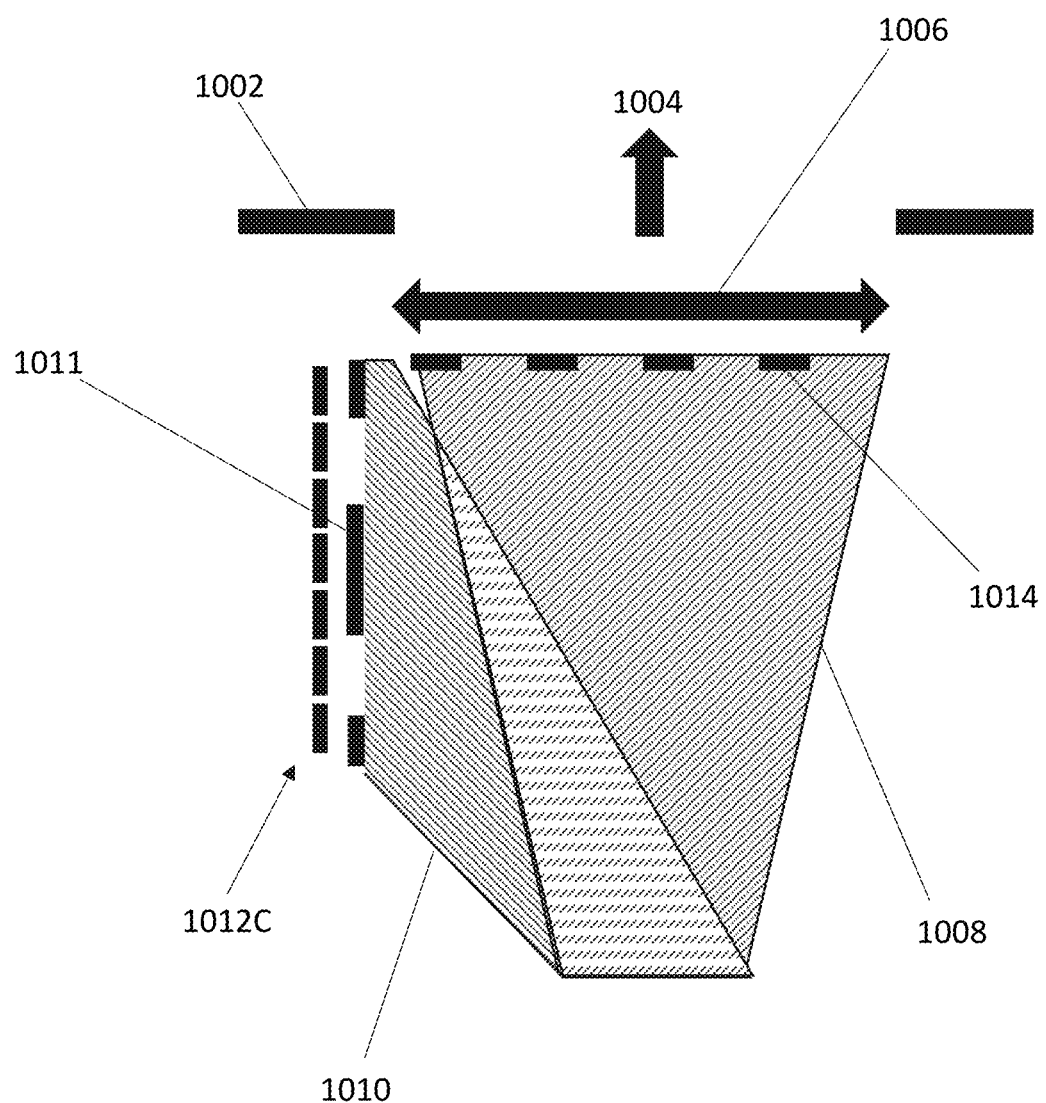
FIG. 10C shows a third arrangement for an improved LIDAR system, in accordance with further embodiments.

FIG. 10C shows another alternative arrangement, which is highly similar to the arrangements of FIGS. 10A and 10B, except that light detectors 1012C are arranged along a plane 1011 that extends (along the y axis) between the SLM (not shown) and the holographic replay plane 1014, substantially perpendicular to the holographic replay plane 1014, within the light cone 1010 that forms the negative first-order (0, −1) holographic replay field. Therefore, the first-order holographic reconstruction will not be focused on the light detectors 1012C in FIG. 10C. Nonetheless, the light at the positions of those light detectors 1012C may nonetheless act as a fingerprint, or identifier, for the illuminated hologram. The light signals from those light detectors 1012C may therefore be sufficient, in many cases, to provide reliable monitoring of the functioning of the system.

As the skilled reader will be aware, the first-order holographic reconstruction that is formed upon illumination of a hologram is fundamentally a reproduction of the zeroth-order holographic reconstruction. Therefore, the first-order holographic reconstruction is generally highly reliable, as an identifier or fingerprint representing the zeroth-order holographic reconstruction, and as an indicator as to whether a specific hologram has been correctly illuminated. The intensity of a first-order holographic reconstruction is reduced by a sinc2 envelope, as compared to a zeroth-order holographic reconstruction. Therefore, the sensitivity of one or more light detectors, for detecting light signals in a first-order holographic reconstruction, may have to be relatively high.

Thus, in some embodiments, a separate marker, or fingerprint, is not introduced into a target image, before a corresponding hologram is calculated. Instead, a higher-order replica of part of the main image (i.e. a higher-order replica of part of the first light pattern region) is used as the fingerprint. For example, the main image, comprised within the first light pattern region, could be the array of light spots shown in FIGS. 8A to 8D. A selection may be made as to what part of a particular higher order replay field should be monitored, and light detectors positioned accordingly. For example, the photodiodes 801, 802, 803, 804 could be aligned with the higher-order replica of the top row (or top two rows) of light spots in the (0, −1) replay field. The system could then monitor signals from the light detectors, as compared to one or more expectations, as detailed above in relation to other embodiments.

Making use of (part of) a higher order replay field, to act as a holographic fingerprint, is advantageous because it means that a dedicated fingerprint does not actually need to be incorporated to the main image. It therefore simplifies the method described herein. It is also optically efficient because adding a fingerprint inherently requires some of the available light, whereas higher-order replay fields are inherently generated when a hologram (or a grating) on a pixelated display device is irradiated. Therefore, if first-order light is used for monitoring a holographic reconstruction, no optical power is wasted. Such monitoring can therefore be described as a zero power loss method.

As the skilled reader will be aware, there are four different first-order holographic reconstructions, for each zeroth-order holographic reconstruction—a negative and a positive, in each of two directions (e.g. the x and y directions). The four different first-order holographic reconstructions may have different respective intensities, depending on optical settings of the system in which an SLM comprised. A controller or processor may therefore be configured to determine which of the four first-order holographic replay fields a detector (or a plurality of detectors) should be positioned in, in order to monitor the light signals therein. In embodiments, the controller is arranged to monitor whichever higher-order replay field is, on average, the brightest first t order replay field for all grating positions.

Waveguide Pupil/Viewing Window Expander

The methods and systems described herein can be implemented in a variety of different holographic projection systems, for example in LIDAR systems that form part of vehicle navigation systems. An example of one type of holographic projection system, which will be known to the skilled reader, is a direct view head-up display (HUD) system. In such a system, the optics are configured so that the driver (i.e. the observer) effectively looks directly at the SLM, without a diffuser therebetween. There is therefore a safety imperative to ensure that the SLM functions correctly, to avoid causing the driver eye damage and also to avoid 'dazzling' him or her, with too much light at a given time, which might impair his or her ability to drive.

In holographic projection systems such as head-up displays (HUDs) it is desirable to expand the exit pupil corresponding to the eye box region or viewing window. In particular, the viewer needs to be able to move his or her head around and so able to see the complete image from any position within a limited area at the eye box/viewing distance. This is known as the eye motion box (EMB), eye-box or, more generally, viewing window. Thus, a pupil expander may be employed to enlarge the EMB or viewing window. Typically, the pupil expander enlarges the EMB by generating extra rays by division of the amplitude of the incident wavefront.

Figure 11:
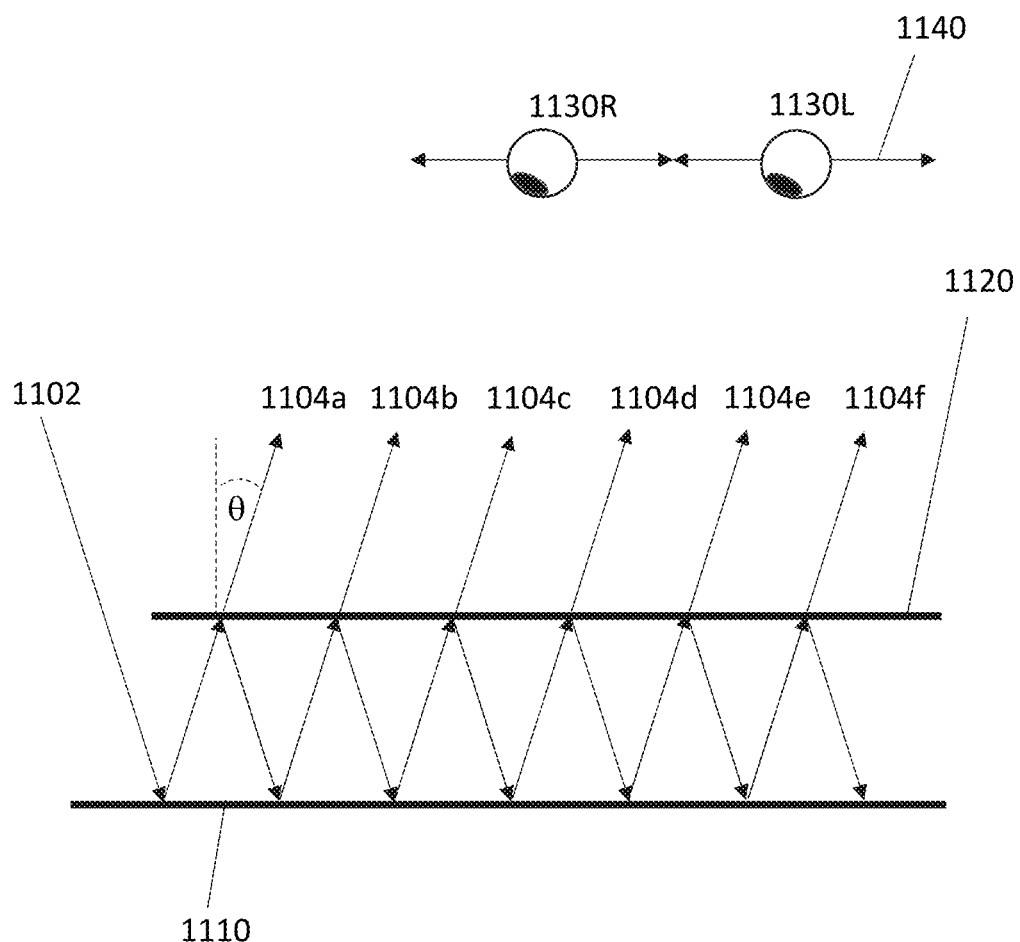
FIG. 11 shows a waveguide pupil expander comprising a pair of parallel mirrors in accordance with some embodiments.

FIG. 11 illustrates an example pupil expander comprising a waveguide. In this example, the waveguide comprises two reflective surfaces but the description that follows is equally applicable to a slab configuration in which light is guided inside by the slab by internal reflections between the top and bottom surface of the slab. The general principle of a waveguide is known in the art and not described in detail herein. A waveguide guides light within a layer between a pair of parallel reflective surfaces by internal reflection. A pupil expander is formed from a waveguide comprising a first graded/partially reflective surface 1120 (e.g. a graded mirror having varying reflectivity with distance) and a second fully reflective surface 1110 (e.g. a mirror having substantially 100% reflectivity). In particular, first reflective surface 1120 comprises a reflective coating the reflectivity of which decreases along the length of the slab. The layer may be glass or Perspex. The waveguide may therefore be a glass or Perspex block or slab. The first reflective surface may be a first surface of the glass block and the second reflective surface may be a second surface of the glass block, wherein the first surface is opposite and parallel to the second surface. Alternatively, the layer may be air and the first and second reflective surface may be separate components—e.g. a first and second mirrors spatially-separated to form an air gap within which light propagates by internal reflection.

Accordingly, as shown in FIG. 11, an input light beam 1102 (which may comprise spatially modulated light encoded with a picture (i.e. light of a picture/image or, simply a picture) or spatially modulated light encoded with a hologram) comprising input light rays enters the waveguide through an input port thereof. The waveguide is arranged to guide light received at the input port to a viewing window. In the illustrated arrangement, the input port comprises a gap in the first partially reflective surface 1120 near one end of the waveguide, but other positions for the input port are possible. The viewing window is an area or volume within which a viewer may view an image as described herein. The angle of incidence of the input light beam 1102 is such that the light rays propagate along the length of the waveguide due to internal reflection by first partially reflective surface 1120 and second fully reflective surface 1110. Example rays are illustrated in FIG. 11. Due to the graded reflectivity of first reflective surface 1120, a proportion of light is transmitted by first reflective surface 1120 to provide a plurality of output light rays 1104a-f (herein called "replicas" because they replicate the input light rays) along the length of the waveguide. Thus, first reflective surface 1120 forms a viewing surface. It is said that the pupil (or viewing window) is expanded by the replicas formed by the waveguide. In particular, by forming a plurality of replicas 1104a-f along the length of the waveguide, the viewing window is increased in size. Each replica 1104a-f corresponds to a proportion of the amplitude (intensity or brightness) of the input light beam 1102. It is desirable that the grading provides a decrease in reflectivity (or conversely an increase in transmissivity) of the first reflective surface 1120 along the length of the waveguide such that each replica 1104a-f has substantially the same amplitude. Thus, a viewer having a right viewer eye 1130R and left viewer eye 1130L at the eye box at a viewing distance from the first reflective surface 1120 is able to see the image at any position within an expanded viewing window, as illustrated by arrows 1140.

The waveguide shown in FIG. 11 expands the viewing window in one dimension—corresponding to the lengthwise direction along which the light beam propagates within the waveguide—as shown by arrows 1140. As the skilled person will appreciate, it is possible to expand the viewing window in two dimensions, when required, by using two orthogonal waveguides.

The first reflective surface 1120 of the waveguide may be coated with a coating comprising a large number of thin films (e.g. 25 or more thin films) in order to provide the necessary graded reflectivity. In particular, as described above, such thin films or similar coatings need to provide decreasing reflectivity, and thus increasing transmissivity, with propagation distance such that the brightness (ray intensity) of each replica 1104a-f is substantially constant. The amplitude of the propagating light beam reduces with propagation distance due to output of the replicas 1104a-f and due to any other optical losses such as imperfect reflections from the second reflective surface 1110. Thus, the grading of the first reflective surface 1120 is designed to take into account the drop in intensity of the propagating light beam with propagation distance, whilst ensuring that each replica 1104a-f has substantially the same intensity so that the image seen has uniform brightness throughout the viewing window (i.e. at all viewing positions).

According to the methods described herein, one or more of the replicas in a waveguide—such as the plurality of output light rays 1104a-f shown in FIG. 11 herein—may be used for monitoring the light within a holographic reconstruction, for example for detecting the presence and/or one or more characteristics of a holographic fingerprint, and/or for monitoring detection signals that indicate the presence or absence of such a fingerprint. Thus, the replicas may be used not only to expand the viewing window, but also to monitor for correct operation of the display device, such as an SLM, to protect the observer from eye damage and from being dazzled.

One or more light detectors may be provided at a suitable location, for monitoring the light without interfering with the core functionality of a waveguide. For example, in the example shown in FIG. 11, one or more photodiodes may be positioned at or near the first reflective surface 1120, at a point at which one of the replica rays is expected to contact it. Although not shown in FIG. 11, an additional replica ray may be provided, which does not travel through the first reflective surface 1120 in order to expand the viewing window, but is instead substantially absorbed (or deflected or otherwise interrupted) by a light detector. For example, such an additional replica might be included following on immediately after replica 1104f, as shown in FIG. 11. A feedback loop may be implemented, whereby the signals output by the one or more detectors in a waveguide may be used to control subsequent operation of the laser source, as described in detail above in relation to earlier figures.

Figure 14:
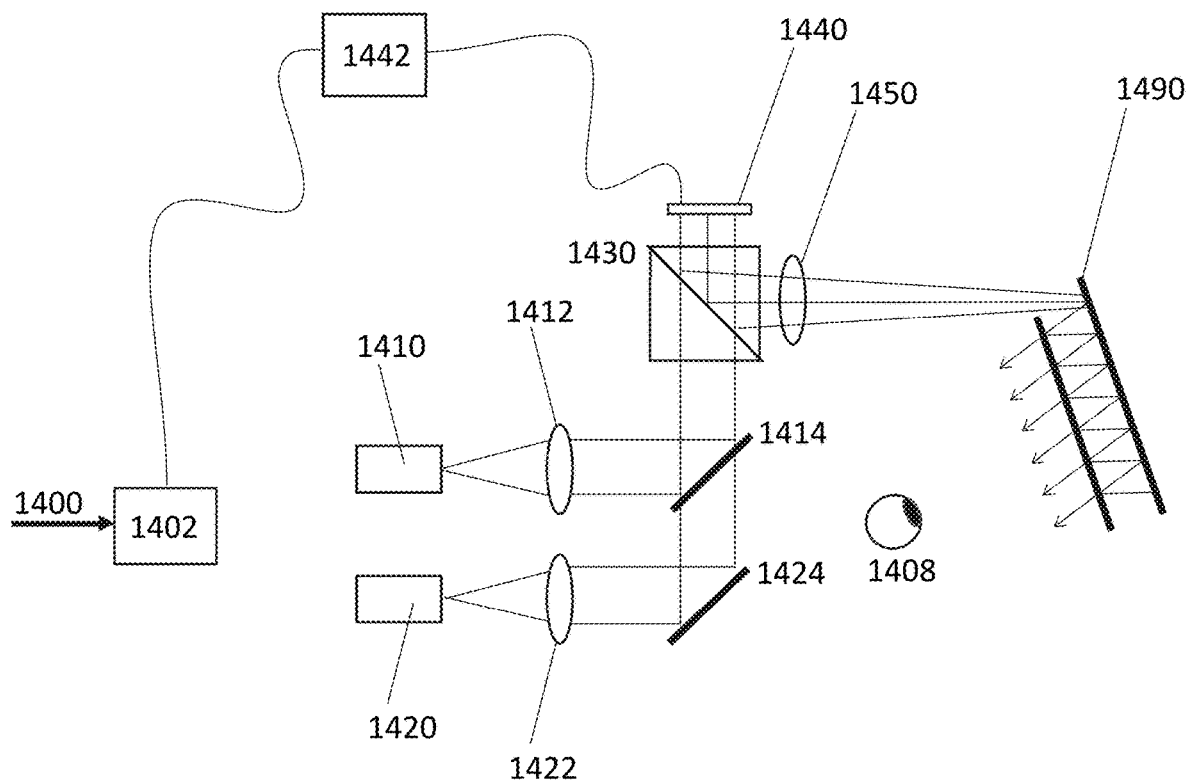
FIG. 14 shows a direct view holographic system including a waveguide pupil expander.

In some arrangements of a waveguide-HUD, for example the arrangement in FIG. 14, discussed in detail herebelow, the holographic reconstruction is not formed until it reaches the retina of an observer's eye. That is, the observer's eye lens acts as the Fourier lens for forming the holographic reconstruction. In such an arrangement, a Fourier lens may be included, to act only on the replica ray that is used for monitoring. The replica ray therefore may be extracted from the waveguide, propagated through a Fourier Lens and may then travel on towards one or more monitoring photodiodes.

Figure 12:
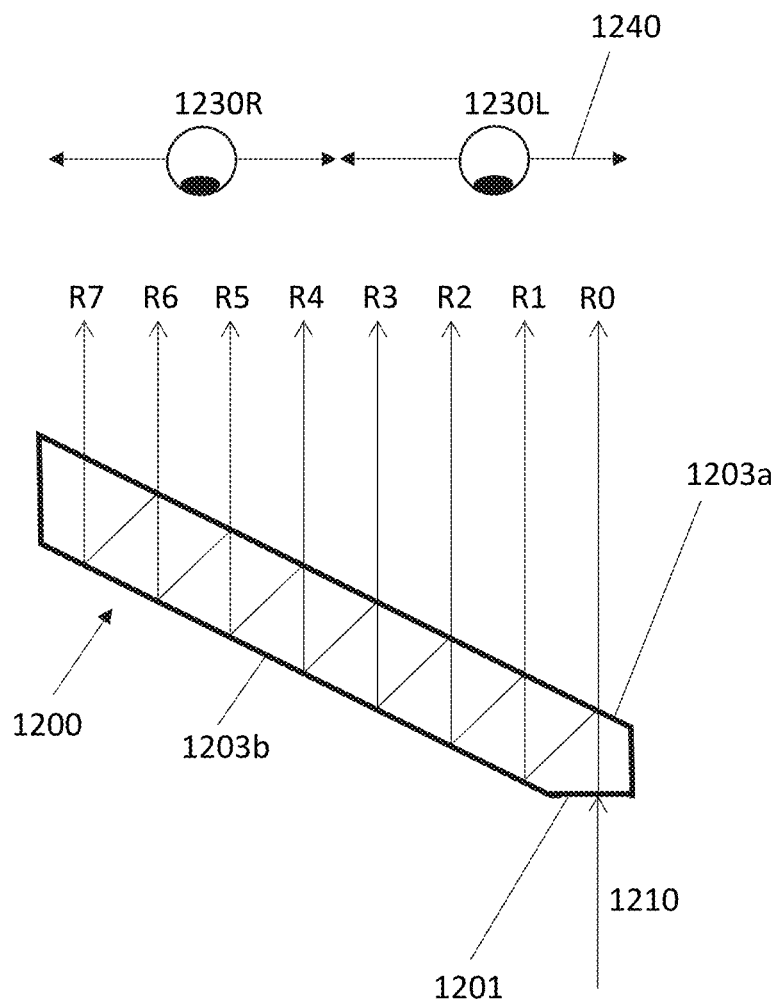
FIG. 12 shows a waveguide pupil expander comprising an optical slab of transparent material in accordance with other embodiments.

FIG. 12 shows a slab waveguide 1200 comprising an input port 1201 arranged to receive input light 1210 such as light of a picture or light of a hologram. The slab is made from a material having a refractive index greater than air. Light received into the slab 1200 is guided by a series of internal reflections between a bottom surface 1203b and an opposing top surface 1203a. The bottom surface 1203b may be a substantially perfect reflector—such as a mirror—and the top surface 1203a may be mostly-reflective. The top surface 1203a may allow some transmission of light. Accordingly, light generally propagates along the slab by internal reflection but a series of replicas, R0 to R7, of the light rays are formed owing to the partial transmissivity of the top surface 1203a. The division of light (or replica of the light rays) shown in FIG. 12 functions to expand the exit pupil of the waveguide. Pupil expansion achieved by the light ray replicas allows a viewer, having a right eye 1230R and left eye 1230L, to move (as shown by arrows 1240) within a viewing window area (or volume) whilst still receiving light of the picture—i.e. whilst still be able to see the picture, or hologram. As described with reference to FIG. 11, the reflectivity of the top surface decreases with distance from the input port so that the intensity of each replica, R0 to R7, is substantially the same. The so-called graded-reflectivity of the top surface 1203a may be provided by a multilayer, dielectric coating. In practice, it is difficult to fabricate an adequate dielectric coating for high quality display—particularly, full colour display.

As detailed above in relation to FIG. 11, according to the methods described herein, one or more light detectors may be included in the waveguide of FIG. 12. For example, an additional replica ray may be provided, which has the purpose of providing a light signal to a photodiode or other detector, in order to monitor the operation of the SLM, and ensure eye safety and comfort for the observer.

The present disclosure also provides an improved waveguide based on a slab. For the avoidance of doubt, FIGS. 13 and 14, which illustrate example system configurations in accordance with this disclosure, show a waveguide formed by two mirrors—rather than a slab with reflective coatings—by way of example only. The effects of light refraction are not fully illustrated in the Figures to preserve simplicity but they will be well-understood by the person skilled in the art.

First Example System

Figure 13:
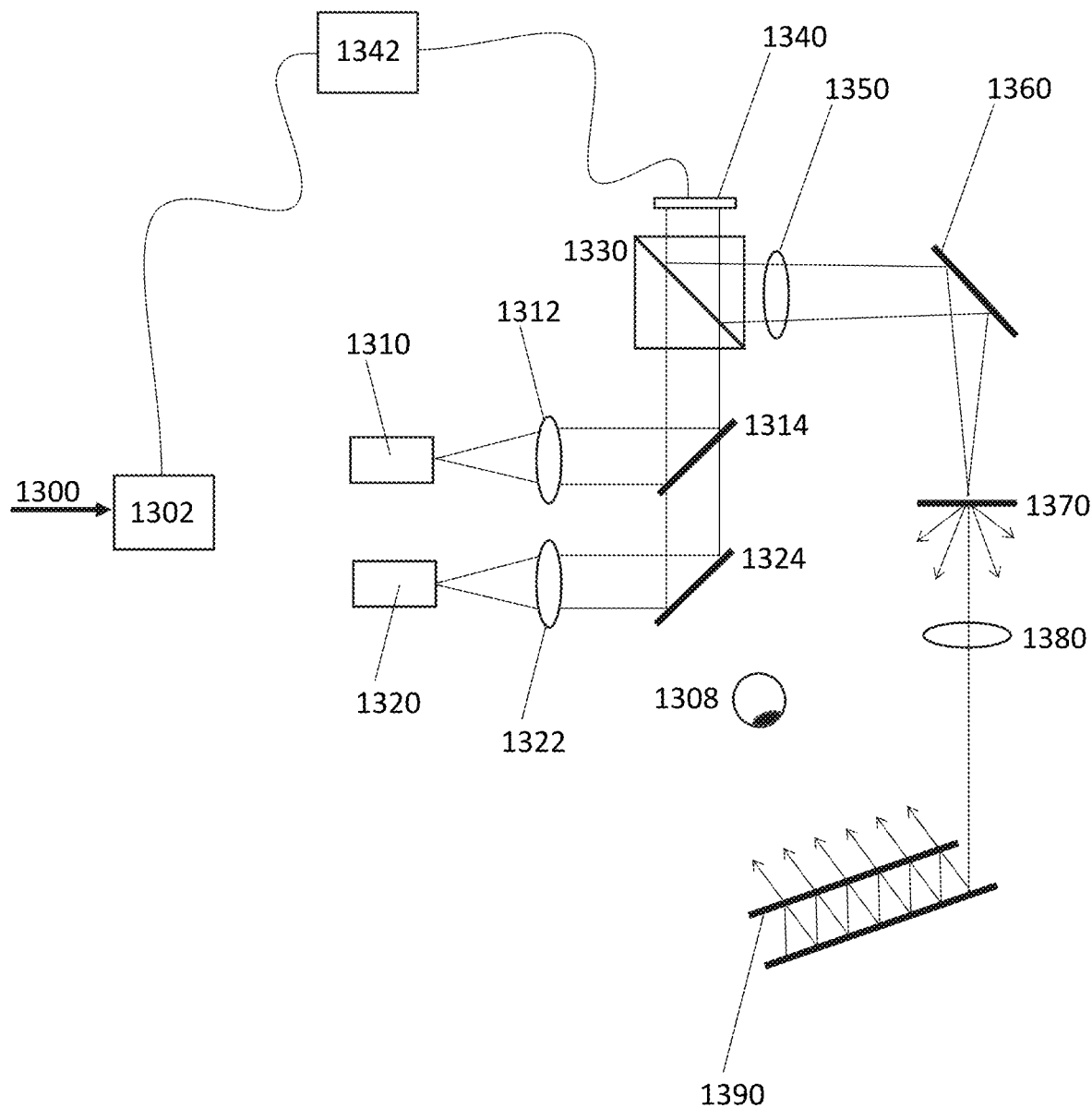
FIG. 13 shows an indirect view holographic system including an intermediate holographic replay screen and waveguide pupil expander.

FIG. 13 shows a holographic display system comprising a waveguide forming a waveguide pupil expander in accordance with a first example system configuration. FIGS. 13 and 14 refer to colour projection systems by way of example only and the present disclosure is equally applicable to a monochromatic system.

The holographic display device comprises a picture generating unit arranged to form a first picture (also called "first image") and a second picture (also called "second image"). A first single colour channel (also called "first display channel") is arranged to form the first picture and comprises a first light source 1310, a first collimating lens 1312 and a first dichroic mirror 1314. First dichroic mirror 1314 is arranged to reflect light of a first wavelength along a common optical path so as to illuminate a spatial light modulator (SLM) 1340. The first wavelength of light corresponds to the first display channel of a first colour (e.g. red). A second single colour channel (also called "second display channel") is arranged to form the second picture and comprises a second light source 1320, a second collimating lens 1322 and a second mirror 1324. Second mirror 1324 is arranged to reflect light of a second wavelength along the common optical path so as to illuminate the SLM 1340. The second wavelength of light corresponds to the second single colour channel of a second colour (e.g. green). In other embodiments, the picture generating unit may comprises a third single colour/display channel (equivalent to the first and second channels) arranged to form a third picture, wherein the third colour channel corresponds to a wavelength of light of a third colour (e.g. blue). In the illustrated embodiment, SLM 1340 comprises a single array of light modulating pixels (e.g. LCOS) that is illuminated by light of both the first and second wavelengths. In other embodiments, SLM 1340 may comprise separate arrays of light modulating pixels that are illuminated by light of the respective first and second wavelengths.

Holographic display device further comprises a holographic controller 1302 arranged to control the picture generating unit. First spatially modulated light of the first colour corresponding to the first picture is output by SLM 1340 to form a first single colour image (e.g. red image) on a light receiving surface 1370, such as a screen or diffuser. A first single colour computer-generated hologram is calculated by a holographic controller 1302 and encoded on SLM 1340, for example by a display driver 1342. The SLM 1340 displays the first hologram and is illuminated by light of the first colour from the first colour/display channel to form a first holographic reconstruction on the light receiving surface 1370 which is positioned at the replay plane. Similarly, second spatially modulated light of the second colour corresponding to the second picture is output by SLM 1340 to form a second single colour image (e.g. green image) on the light receiving surface 1370. A second single colour computer-generated hologram is encoded on SLM 1340 by holographic controller 1302. The SLM 1340 displays the second hologram and is illuminated by light of the second colour from the second colour/display channel to form a second holographic reconstruction on the light receiving surface at the replay plane.

In the illustrated arrangement, a beam splitter cube 1330 is arranged to separate input light to SLM 1340 and spatially modulated light output by SLM 1340. A Fourier lens 1350 and mirror 1360 are provided in the optical path of the output spatially modulated light to light receiving surface 1370. It may be said that a first/second picture is formed on the light receiving surface 1370. The first/second pictures are first/second holographic reconstructions of the respective first/second holograms. Thus, a composite colour picture may be formed on light receiving surface 1370 combining the first and second pictures. A projection lens 1380 is arranged to project the first and second pictures formed on the light receiving surface 1372 to an input port of a pupil expander in the form of a waveguide 1390. A viewer 1308 may view a magnified image of the pictures from the expanded eye box—the "viewing window"—formed by waveguide 1390 owing to optical power of projection lens 1380. Waveguide 1390 comprises an optically transparent medium separated by first and second reflective surfaces as described above with reference to FIG. 11. Thus, holographic display device has an "indirect view" configuration—that is the viewer does not directly view the holographic reconstruction, but rather views pictures formed on the light receiving surface 1370.

In other example implementations, three or more display channels may be provided configured to display respective single colour holograms. For example, a full-colour composite image/picture may be formed by displaying respective red, green and blue single colour holograms. The present disclosure may be implemented using a picture generating unit comprising any number of single colour channels including just one colour channel.

Second Example System

FIG. 14 shows a holographic display system comprising waveguide pupil expander in accordance with second example system configuration.

The holographic display system illustrated in FIG. 14 is similar to the holographic display system of FIG. 13 but characterised by the absence of a screen between the spatial light modulator and viewing plane. Components in FIG. 14 that are similar to those in FIG. 13 have similar reference numerals, but beginning with '14' instead of '13'. A first display channel is arranged to form a first image (e.g. red image) on a light receiving surface, which is positioned at the replay plane. A first single colour computer-generated hologram is encoded on SLM 1440 by a holographic controller 1402. The SLM 1440 displays the first hologram and is illuminated by light from the first colour channel to form a first holographic reconstruction on the light receiving surface. Similarly, the second display channel is arranged to form the second image (e.g. green image) on the light receiving surface. A second single colour computer-generated hologram is encoded on SLM 1440 by holographic controller 1402. The SLM 1440 displays the second hologram and is illuminated by light from the second colour channel to form a second holographic reconstruction on the light receiving surface at the replay plane.

The holographic display device further comprises a beam splitter cube 1430, arranged to separate input light to and output light from SLM 1440. However, in contrast FIG. 13, the holographic display device is a direct view system. In the illustrated arrangement, a lens 1450 is positioned in the optical path of the spatially modulated light output by SLM 1440. Lens 1450 is optional. A viewer 1408 may directly-view the spatially modulated light from the spatial light modulator. In some embodiments, as described above, the lens of the viewer's eye forms a holographic reconstruction on the retina of the eye. In these embodiments, it may be said that the viewer receives spatially modulated light encoded with the hologram. In other embodiments, the viewer receives light of the picture or light encoded with the picture. The picture may be formed at an intermediate plane in free space. Waveguide 1490 comprises an optically transparent medium separated by first and second reflective surfaces as described above. Thus, the holographic display device has an "direct view" configuration, wherein the viewer looks directly at the display device (i.e. spatial light modulator), such that the light receiving surface of FIG. 13 is optional.

Again, the arrangements of FIGS. 13 and 14 can be configured, according to the methods described herein, to include one or more light detectors, within a waveguide, for detecting the light emitted from an SLM, such as the SLM 1340 and/or the SLM 1440. For example, the waveguide 1390 or the waveguide 1490 may be configured to include one or more photodiodes, to monitor the presence or absence of, and optionally one or more characteristics of, one or more replica rays. The waveguide 1390, 1490 may be configured to provide an additional replica ray or rays—in addition to those shown in FIGS. 13 and 14 and described hereabove—wherein that additional ray or rays is/are dedicated to being detected by one or more suitable light detectors, for monitoring the output of the SLM 1340, 1440, for ensuring safe operation of the respective system.

Although specific examples have been illustrated and described in detail hereabove, other variations are also contemplated. For example, in FIGS. 7A and 7B the aperture 746 and photodiodes 748, 749 are shown and described as being located substantially at the intermediate holographic replay plane, at which an initial (or 'original', or 'intermediate') holographic reconstruction is formed, in free space. However, according to some arrangements, the aperture and photodiodes may instead be located at an image plane, with a physical lens (similar to the imaging lens 756 shown in FIGS. 7A and 7B) optionally being present between the SLM and the image plane. There may be a physical optical component present at the image plane, such as a diffuser.

According to some arrangements, a physical lens may be included, to move the holographic replay plane in the z direction. Therefore, the holographic replay plane may not be located between the SLM and an imaging lens, as shown in FIGS. 7A and 7B herein.

In other arrangements, one or more detectors may be implemented in order to image and/or to monitor the (distribution of) scatter of structured light comprised within the zeroth-order replay field of a holographic reconstruction, off the inside surface of projection lens, such as the projection lens 756, shown in FIGS. 7A and 7B. Such detectors may monitor for evidence of "safe" distribution of light, as an indicator of the safety or operation of the SLM, the irradiation of which has formed the holographic reconstruction.

One or more light detectors, or photodiodes, which are used to monitor light to determine safe operation of an SLM may also have other functions. For example, although the examples detailed above monitoring whether an SLM is displaying correct content, one or more of the light detection elements could also be used to monitor the emitted power from the laser light source. This can enable the safeguarding method, as described herein, to monitor both that the power of the laser is below a threshold and that the SLM is distributing the light correctly.

For example, in some arrangements it may be possible to use one or more photodiode measurements as a time trigger for a LIDAR time-of-flight measurement. That is; since the photodiodes would be located on the "transmit" path of light emitted (for example, reflected) from an SLM, the time signatures of signals recorded by the photodiodes may be used to "start the clock" that records the time for a pulse of light, which leave the SLM, to be reflected back from the scene, towards a scene detector in a LIDAR system. As the skilled person will know; currently the trigger to "start the clock" is taken to from the electronics that drive the laser pulse rather than attempting to measure the time of the outgoing light directly. Therefore, using timing from photodiode signals along the transmit path may improve the overall accuracy of the LIDAR system's measurements and observations.

Thus, methods and systems are described herein that provide sought after, and often necessary, monitoring of an SLM, for example within a LIDAR system, to ensure it operates safely and correctly, and does not risk the eye safety or comfort or driving safety of the observer.

The systems and methods described herein can enable highly reliable monitoring of scene illumination in a LIDAR system. This could be particularly useful if, for example, a characteristic of a holographic reconstruction (or an image of that holographic reconstruction) is liable to change with ambient temperature. In such a scenario; by accurately and closely monitoring the actual characteristics of, and/or the actual detection signals relating to, the holographic reconstruction, a determination can be made as to its nature and therefore an appropriate selection can be made, in order to set or amend a subsequent illumination pattern, for the system.

The systems and methods described herein can be provided in a simple and relatively low-cost manner. The inclusion of an aperture and one or more light detectors can be readily implemented in existing optical arrangements, and/or in future optical arrangements. Moreover, the monitoring of signals from one or more light detectors, and issuing of control signals, accordingly, can be readily carried out by existing controllers or other processors, without placing undue computational burden thereon.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, a light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A holographic projector comprising:
   a spatial light modulator arranged to display a hologram of a light pattern for projection and to spatially-modulate light to form a holographic reconstruction, wherein the holographic reconstruction is spatially-separated from the spatial light modulator;
   a detector array comprising a plurality of light detection elements arranged to detect light corresponding to a respective plurality of positions of the holographic reconstruction and to provide a respective plurality of output signals related to light detection; and
   a fault detection circuit arranged to compare one or more of the plurality of output signals from the respective plurality of light detection elements with one or more of a plurality of expected signals based on the light distribution of the light pattern.

2. The holographic projector as claimed in claim 1 wherein the fault detection circuit is arranged to alter or to prevent further light projection, if it identifies a difference between said one or more output signals from the respective plurality of detection elements and the one or more expected signals.

3. The holographic projector as claimed in claim 2 wherein the fault detection circuit is arranged to alter or to prevent further light projection only if the identified difference is greater than an acceptability value.

4. The holographic projector as claimed in claim 1 wherein the one or more of the plurality of expected signals is time-varying.

5. The holographic projector as claimed in claim 1 wherein each light pattern of a sequence of light patterns for projection is configured such that only one detection element of the plurality of detection elements should receive light of the holographic reconstruction at a time.

6. The holographic projector as claimed in claim 1 wherein each light pattern of a sequence of light patterns for projection is configured such that the detection element, or the specific combination of detection elements, that should receive light changes with each successive light pattern of the sequence of light patterns.

7. The holographic projector as claimed in claim 1 wherein the light pattern for projection comprises a primary light pattern region and a secondary light pattern region, and each position of the plurality of positions is within the secondary light pattern region.

8. The holographic projector as claimed in claim 7 wherein the secondary light pattern region is different to the primary light pattern region.

9. The holographic projector as claimed in claim 7 wherein the second light pattern region is spatially-separated from the primary light pattern region.

10. The holographic projector as claimed in claim 1 wherein each position of the plurality of positions that are respectively monitored by the plurality of detection elements is within a higher-order repeat of a zero-order holographic replay field.

11. The holographic projector as claimed in claim 10 wherein the plurality of positions within a higher-order repeat are substantially adjacent to the zero-order holographic replay field.

12. The holographic projector as claimed in claim 1 wherein the light pattern comprises an array of light spots for light detection and ranging, "LIDAR".

13. The holographic projector as claimed in claim 12 wherein the holographic projection system further comprises a LIDAR controller arranged to move or change the holographic replay field in time such that each light spot of the array of light spots effectively occupies a plurality of different positions on the holographic replay plane during a scan period, wherein the movement of the light spots to their different positions during the scan period correlates with the plurality of positions respectively monitored by the plurality of detection elements.

14. A method of monitoring operation of a holographic projector, the holographic projector comprising:
a spatial light modulator arranged to display a hologram of a light pattern and to spatially-modulate light to form a holographic reconstruction, wherein the holographic reconstruction is spatially-separated from the spatial light modulator;
a detector array comprising a plurality of light detection elements arranged to detect light corresponding to a respective plurality of positions of the holographic reconstruction and to provide a respective plurality of output signals related to light detection; and
a fault detection circuit;
the method comprising:
displaying, at the spatial light modulator, a hologram of a light pattern;
illuminating the spatial light modulator, to form a holographic reconstruction of the light pattern,
detecting, at the detector array, a light signal corresponding to the holographic reconstruction;
receiving, at the fault detection circuit, an output signal from a light detection element, within the detector array, relating to the detected light signal corresponding to the holographic reconstruction; and
comparing the received output signal with one or more of a plurality of expected signals, which are based on the light distribution of the light pattern.

15. The method of claim 14 wherein the fault detection further determines, as a result of said comparison, whether any difference exists between the received output signal and the one or more of a plurality of expected signals.

16. The method of claim 15, wherein the fault detection further determines whether a difference, if it exists, is greater than an acceptability value.

17. The method of claim 15 further comprising controlling the holographic projector so that, if it is determined that a difference exists between the received output signal and the one or more of a plurality of expected signals, or if it is determined that a difference exists that is greater than an acceptability value, further light projection is prevented or altered.

18. The method of any of claim 14, wherein said method is a computer-implemented method.

19. A non-transitory computer readable medium having stored thereon computer program instructions which, when executed by data processing apparatus, causes the data processing apparatus to perform a method of monitoring operation of a holographic projector, the holographic projector comprising:
a spatial light modulator arranged to display a hologram of a light pattern and to spatially-modulate light to form a holographic reconstruction, wherein the holographic reconstruction is spatially-separated from the spatial light modulator;
a detector array comprising a plurality of light detection elements arranged to detect light corresponding to a respective plurality of positions of the holographic reconstruction and to provide a respective plurality of output signals related to light detection; and
a fault detection circuit;
the method comprising:
displaying, at the spatial light modulator, a hologram of a light pattern;
illuminating the spatial light modulator, to form a holographic reconstruction of the light pattern,
detecting, at the detector array, a light signal corresponding to the holographic reconstruction;
receiving, at the fault detection circuit, an output signal from a light detection element, within the detector array, relating to the detected light signal corresponding to the holographic reconstruction; and
comparing the received output signal with one or more of a plurality of expected signals, which are based on the light distribution of the light pattern.

* * * * *